United States Patent
Kurihara et al.

(10) Patent No.: US 11,247,538 B2
(45) Date of Patent: Feb. 15, 2022

(54) LAMINATED GLASS

(71) Applicant: ZEON CORPORATION, Tokyo (JP)

(72) Inventors: Ryuta Kurihara, Tokyo (JP); Teiji Kohara, Tokyo (JP)

(73) Assignee: ZEON CORPORATION, Tokyo (JP)

(*) Notice: Subject to any disclaimer, the term of this patent is extended or adjusted under 35 U.S.C. 154(b) by 23 days.

(21) Appl. No.: 16/467,164

(22) PCT Filed: Dec. 15, 2017

(86) PCT No.: PCT/JP2017/045201
§ 371 (c)(1),
(2) Date: Jun. 6, 2019

(87) PCT Pub. No.: WO2018/116997
PCT Pub. Date: Jun. 28, 2018

(65) Prior Publication Data
US 2019/0315201 A1    Oct. 17, 2019

(30) Foreign Application Priority Data
Dec. 22, 2016    (JP) .............................. JP2016-248715

(51) Int. Cl.
*B32B 17/10*    (2006.01)
*B60J 1/00*    (2006.01)
(Continued)

(52) U.S. Cl.
CPC ........... *B60J 1/00* (2013.01); *B32B 17/10036* (2013.01); *B32B 17/1055* (2013.01);
(Continued)

(58) Field of Classification Search
CPC .......... B32B 17/10–1099; B32B 27/302; B60J 1/001; B60J 1/002; B60J 1/02; C08L 53/00–025
See application file for complete search history.

(56) References Cited

U.S. PATENT DOCUMENTS 6,265,054 B1 * 7/2001 Bravet ............. B32B 17/10917
428/213
2004/0260028 A1 12/2004 Sone
(Continued)

FOREIGN PATENT DOCUMENTS

EP    0816064 A1    1/1998
EP    2623526 A1    8/2013
(Continued)

OTHER PUBLICATIONS

Jul. 2, 2020, the Extended European Search Report issued by the European Patent Office in the corresponding European Patent Application No. 17883101.2.
(Continued)

*Primary Examiner* — Z. Jim Yang
(74) *Attorney, Agent, or Firm* — Kenja IP Law PC

(57) ABSTRACT

Provided is a laminated glass where multiple glass sheets are joined via an interlayer film [J], wherein i) mean density of the laminated glass is 1.2-1.5 g/cm$^3$ at 25° C., ii) the interlayer film [J] has layered structure comprising at least two adhesive layers [G], comprising an adhesive mainly containing a thermoplastic elastomer having an alkoxysilyl group [F]; and at least one rigid resin layer [H] positioned therebetween, iii) storage modulus of the rigid resin layer [H] is higher than that of the adhesive layer [G], iv) storage modulus of the interlayer film [J] calculated from a formula 1 or measured is 2.0×10$^8$-1.0×10$^9$ Pa at −20° C. and 1.0× 10$^8$-8.0×10$^8$ Pa at 40° C., $$G'=(\Sigma_i t_i)/(\Sigma_i(t_i/G'_i)) \tag{1}$$

where G': calculated storage modulus of the interlayer film, G'$_i$: storage modulus of an i-th layer of the interlayer film, t$_i$: thickness of the i-th layer, $\Sigma_i$: sum of numerical values of the i-th layer.

5 Claims, 1 Drawing Sheet

(51) Int. Cl.
  *B32B 27/30* (2006.01)
  *C08L 53/02* (2006.01)
(52) U.S. Cl.
  CPC ...... *B32B 17/10688* (2013.01); *B32B 27/302* (2013.01); *C08L 53/025* (2013.01); *B32B 2605/00* (2013.01)

(56) References Cited

U.S. PATENT DOCUMENTS

| | | |
|---|---|---|
| 2010/0227135 A1 | 9/2010 | Takagi et al. |
| 2013/0008506 A1 | 1/2013 | Tanahashi et al. |
| 2015/0104654 A1* | 4/2015 | Kohara ............ B32B 17/10697 428/429 |
| 2015/0111016 A1 | 4/2015 | Fisher et al. |
| 2017/0239918 A1* | 8/2017 | Nakamura .............. B32B 27/18 |
| 2017/0282693 A1* | 10/2017 | Miyasaka ................ B32B 7/12 |
| 2017/0320297 A1* | 11/2017 | Bennison ............. B32B 27/308 |
| 2017/0334173 A1* | 11/2017 | Yui .................. B32B 17/10559 |
| 2018/0099486 A1* | 4/2018 | Kanda .................... B32B 27/34 |
| 2018/0117883 A1* | 5/2018 | Olson .................... B32B 27/30 |
| 2019/0070833 A1* | 3/2019 | Machida .................. C09J 7/243 |
| 2019/0084277 A1* | 3/2019 | Nakamura ........ B32B 17/10036 |
| 2019/0105878 A1* | 4/2019 | Nakamura ........ B32B 17/10816 |
| 2019/0218389 A1* | 7/2019 | Senda .............. B32B 17/10724 |

FOREIGN PATENT DOCUMENTS

| | | |
|---|---|---|
| EP | 3239181 A1 | 11/2017 |
| EP | 3287426 A1 | 2/2018 |
| JP | H06915 A | 1/1994 |
| JP | H111349 A | 1/1999 |
| JP | 2002326847 A | 11/2002 |
| JP | 2015000821 A | 1/2015 |
| JP | 2015078090 A | 4/2015 |
| WO | 03018656 A1 | 3/2003 |
| WO | 2010102282 A1 | 9/2010 |
| WO | 2011096389 A1 | 8/2011 |
| WO | 2012043708 A1 | 4/2012 |
| WO | 2013176258 A1 | 11/2013 |
| WO | 2013181484 A1 | 12/2013 |
| WO | 2016171068 A1 | 10/2016 |

OTHER PUBLICATIONS

Jun. 25, 2019, International Preliminary Report on Patentability issued in the International Patent Application No. PCT/JP2017/045201.

* cited by examiner

LAMINATED GLASS

TECHNICAL FIELD

The present disclosure relates to a lightweight laminated glass, and more particularly to a laminated glass to which a lightweight property is imparted while other properties such as rigidity, impact resistance, and heat resistance are maintained.

BACKGROUND

Reducing weight of automobiles is a useful technology for lowering fuel consumption to protect the environment. Such weight reduction is attempted by, for example, replacing some of metal parts with plastic parts, employing window materials made of transparent plastic such as polycarbonate instead of glass, and so on.

With plastics, however, it has not achieved yet to as weight-saved as expected since the transparent plastic sheets need to be thickened in order to maintain its rigidity as comparable to that of glass. In addition, a hard coating layer is required onto the transparent plastic sheets in order to impart scratch resistance, which causes issues such as higher costs, preventing the plastics from becoming popularly used.

As a lightweight safety glass, PTL 1 discloses a laminated glass where polycarbonate is used as an interlayer film over which a glass surface is laid with an adhesive layer of polyvinyl butyral layer. The laminated glass of PTL 1 has a specific gravity of 1.2 to 2.0 $g/cm^3$.

However, in such a case of including the polyvinyl butyral layer having a low elastic modulus, the laminated glass as a whole consequently has a low bending modulus. Therefore, overall thickness of the laminated glass needs to be increased so as to maintain the rigidity against bending stress. This leads to an issue that PTL 1 is less effective in reducing weight of the laminated glass.

As a solution to this, PTL 2 uses a resin interlayer film consisting of resin that has Young's modulus not less than a specified value, and decreases thickness of a glass sheet while increasing thickness of the resin interlayer film. PTL 2 thus discloses that a lighter laminated glass than a glass sheet can be obtained with its bending rigidity maintained as comparable to that of the glass sheet.

This literature also provides examples of specific materials forming the resin interlayer film that allows lighter weight than the glass sheet alone. Such examples include polyethylene ionomer, polycarbonate, polyurethane, polyethylene terephthalate, and acrylic resin. For example, in a case of a laminated glass where the resin interlayer film consisting of polyethylene ionomer is used, it is indicated that 34% of weight reduction with respect to the glass is achieved (with a mean density of the laminated glass of about 1.3 $g/cm^3$). And in a case of a laminated glass where the resin interlayer film consisting of polycarbonate is used, it is reported that 27% of weight reduction is achieved (with a mean density of the laminated glass of about 1.5 $g/cm^3$).

When the lightweight laminated glass, with the interlayer film consisting of the resin listed above, was used as a window material for automobiles, however, properties such as impact resistance (under temperature conditions of −20° C. and 40° C.), heat resistance, light resistance, and moisture resistance according to the standard for safety glazing materials for road vehicles JIS R 3211 were not satisfactory, even though its bending rigidity was kept to a given extent.

Further in this literature where the resin interlayer film consisting of polyvinyl butyral is used, obtaining a lighter laminated glass than a glass sheet alone, with its bending rigidity being kept to a given extent, is indicated to be difficult.

PTL 3 discloses a laminated glass where a resin interlayer film of ethylene-vinyl acetate copolymer (EVA) and/or polyvinyl butyral (PVB) as well as thin glass are used. The laminated glass of PTL 3 is sound insulative and heat insulative with an areal density of 8.8 $kg/m^2$.

This literature describes that the obtained laminated glass has a reduced glass thickness as well as a decreased areal density by approximately 30% with respect to a laminated glass of Comparative example. However, the literature does not describe about, for example, decreasing in bending rigidity in the obtained laminated glass.

PTL 4 discloses a lightweight laminated glass where a thin glass sheet of 1.5 mm or less in thickness is laid over an interlayer film consisting of ionomers to have favorable adhesiveness against impact as well as moisture resistance. This literature also discloses that the interlayer film may include a resin layer of such as polycarbonate.

In the laminated glass with ionomers as the interlayer film, however, there is an issue that the adhesiveness to glass is decreased under a low temperature of about −20° C., as in the case of the laminated glass described in PTL 2.

PTL 5 discloses a laminated glass of low mass where an interlayer film, consisting of a stacked body of a macromolecule layer with high Young's modulus and a macromolecule layer with low Young's modulus, is placed between two thin glass sheets of less than 1.5 mm in thickness.

The interlayer film described in this literature, however, is not advantageous for further weight reduction while maintaining rigidity of the laminated glass as a whole. This is due to the macromolecule layer with low Young's modulus included in the interlayer film.

PTL 6 discloses a laminated glass in which a modified hydrogenated block copolymer is used as an interlayer film for the laminated glass, wherein the modified hydrogenated block copolymer is obtained by introducing alkoxysilyl groups into a hydrogenated block copolymer consisting of a polymer block mainly containing repeat units derived from an aromatic vinyl compound and a polymer block mainly containing repeat units derived from a chain conjugated diene compound. The laminated glass thus has a ratio of total thickness of the interlayer film to total thickness of the glass sheet (thickness of interlayer film/thickness of glass sheet) in a range of 0.1 to 4.0. This literature also discloses a laminated glass of Example having a value of thickness of interlayer film/thickness of glass sheet of 3.0.

However, it was difficult to maintain desirable rigidity in this laminated glass.

CITATION LIST

Patent Literature

PTL 1: JPH6-915A
PTL 2: JPH11-001349A
PTL 3: JP2002-326847A
PTL 4: WO2010/102282
PTL 5: WO2013/181484
PTL 6: JP2015-821A

SUMMARY

Technical Problem

This disclosure was made in consideration of the aforementioned circumstances. It would therefore be helpful to provide a lightweight laminated glass, useful as window materials for automobiles and so on; having reduced mean density while maintaining desirable rigidity; as well as maintaining properties such as, for example, impact resistance (under temperature conditions of −20° C. and 40° C.), heat resistance, light resistance, and moisture resistance according to JIS R 3211.

Solution to Problem

The inventor conducted diligent investigation into materials for an interlayer film used in a laminated glass, with the aim of solving the problems described above.

As a result, the inventor found that it is possible to solve the aforementioned problems by employing an interlayer film formed of an adhesive layer and a rigid resin layer, wherein the adhesive layer mainly contains a thermoplastic elastomer having an alkoxysilyl group and has a specific storage modulus in viscoelastic properties, and wherein the rigid resin layer has a storage modulus higher than that of the adhesive layer. This finding lead to the present disclosure.

Thus laminated glass as described in followings (1) to (5) is provided.

(1) A laminated glass in which a plurality of glass sheets is joined together with an interlayer film [J] in between, wherein (i) a mean density of the laminated glass is in a range from 1.2 to 1.5 g/cm$^3$ at a temperature of 25° C., (ii) the interlayer film [J] has layered structure formed of at least two adhesive layers [G] and at least one rigid resin layer [H] positioned between the two adhesive layers [G], the adhesive layer [G] being made of an adhesive that mainly contains a thermoplastic elastomer having an alkoxysilyl group [F], (iii) a storage modulus of the rigid resin layer [H] has a higher value than a storage modulus of the adhesive layer [G], and (iv) a storage modulus of the interlayer film [J], which is either calculated from a following formula 1 or measured, is in a range from $2.0 \times 10^8$ to $1.0 \times 10^9$ Pa at a temperature of −20° C. and $1.0 \times 10^8$ to $8.0 \times 10^8$ Pa at a temperature of 40° C.

$$G' = (\Sigma_i t_i)/(\Sigma_i (t_i/G'_i)) \quad (1)$$

In the formula 1, G' denotes the calculated storage modulus of the interlayer film, $G'_i$ denotes the storage modulus of an i-th layer in the interlayer film, $t_i$ denotes a thickness of the i-th layer. And $\Sigma_i$ denotes a sum of numerical values of the i-th layer.

(2) The laminated glass according to (1), wherein the thermoplastic elastomer having an alkoxysilyl group [F] is made of at least two polymer blocks [A] and at least one polymer block [B], the polymer block [A] mainly containing a structural unit derived from an aromatic vinyl compound, while the polymer block [B] mainly containing a structural unit derived from a chain conjugated diene compound, and wherein the thermoplastic elastomer having an alkoxysilyl group [F] is a modified hydrogenated block copolymer [E] for which the alkoxysilyl group is introduced into a hydrogenated block copolymer [D], the hydrogenated block copolymer [D] obtainable from hydrogenation of a block copolymer [C], the block copolymer [C] having a ratio between wA and wB as wA:wB of 30:70 to 60:40 where wA denotes a weight fraction of a total amount of the polymer block [A] accounting for the whole block copolymer [C] while wB denotes a weight fraction of a total amount of the polymer block [B] accounting for the whole block copolymer [C].

(3) The laminated glass according to (1), wherein the thermoplastic elastomer having an alkoxysilyl group [F] is made of at least two polymer blocks [A] and at least one polymer block [B], the polymer block [A] mainly containing a structural unit derived from an aromatic vinyl compound, while the polymer block [B] mainly containing a structural unit derived from a chain conjugated diene compound, and wherein the thermoplastic elastomer having an alkoxysilyl group [F] is a modified hydrogenated block copolymer [E] for which the alkoxysilyl group is introduced into a hydrogenated block copolymer [D], the hydrogenated block copolymer [D] obtainable from 95% or more of hydrogenation of carbon-carbon unsaturated bonds in a main chain and a side chain as well as of carbon-carbon unsaturated bonds in aromatic rings of a block copolymer [C], the block copolymer [C] having a ratio between wA and wB as wA:wB of 30:70 to 60:40 where wA denotes a weight fraction of a total amount of the polymer block [A] accounting for the whole block copolymer [C] while wB denotes a weight fraction of a total amount of the polymer block [B] accounting for the whole block copolymer [C].

(4) The laminated glass according to any one of (1) to (3), wherein the rigid resin layer [H] is a layer formed of at least one rigid resin selected from the group consisting of hydrogenated block copolymer [S] containing, in a molecule, a polymer block having a repeat unit derived from an aromatic vinyl compound and a polymer block having a repeat unit derived from a chain conjugated diene compound; polycarbonate; polyester-based resin; and poly (meth) acrylic acid ester-based resin.

(5) The laminated glass according to (4), wherein the hydrogenated block copolymer [S] is made of at least two polymer blocks [P] and at least one polymer block [Q], the polymer block [P] mainly containing a structural unit derived from an aromatic vinyl compound, while the polymer block [Q] mainly containing a structural unit derived from a chain conjugated diene compound, and wherein the hydrogenated block copolymer [S] is obtainable from 95% or more of hydrogenation of carbon-carbon unsaturated bonds in a main chain and a side chain as well as of carbon-carbon unsaturated bonds in aromatic rings of a block copolymer [R], the block copolymer [R] having a ratio between wP and wQ as wP:wQ of 50:50 to 70:30 where wP denotes a weight fraction of a total amount of the polymer block [P] accounting for the whole block copolymer [R] while wQ denotes a weight fraction of a total amount of the polymer block [Q] accounting for the whole block copolymer [R].

Advantageous Effect

It is therefore possible to provide a laminated glass excellent in a lightweight property, having reduced mean density while maintaining rigidity and impact resistance (under temperature conditions of −20° C. and 40° C.) to be equal to or greater than those of conventional laminated glass widely used as automobile windows and so on.

The presently disclosed laminated glass is of use as window materials for vehicles, window materials for buildings, roofing materials, flooring materials, window materials for watercrafts and aircrafts, and so on.

DETAILED DESCRIPTION

Figure 1:
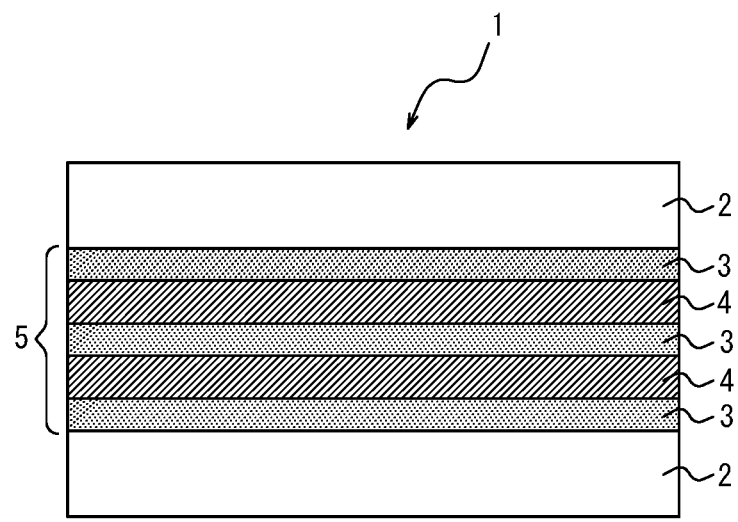
FIG. 1 illustrates a sectional view of an example of the laminated glass according to the present disclosure.

Laminated glass of present disclosure will now be described in details in separated sections of (a) interlayer film [J], (b) adhesive layer [G], (c) rigid resin layer [H], and (d) laminated glass.

(a) Interlayer Film [J]

An interlayer film [J] used for the presently disclosed laminated glass is formed of at least two transparent adhesive layers [G] and at least one transparent rigid resin layer [H] having a storage modulus higher than that of the adhesive layer [G].

The adhesive layers [G] is made of an adhesive mainly containing a thermoplastic elastomer having an alkoxysilyl group [F].

The interlayer film [J] is adhered with a glass sheet with the adhesive layers [G] in between. Other adhesive layers [G] than the adhesive layer [G] in contact with the glass sheet, as well as the rigid resin layers [H] may form any layered structure.

Number of layers forming the interlayer film [J] is normally from 3 to 100 layers, preferably 4 to 50 layers, more preferably 5 to 20 layers, particularly preferably 5 layers or more, and particularly preferably 9 layers or less.

The layered structure of the interlayer film [J] may be, for example, 3-layer structure of adhesive layer [G]/rigid resin layer [H]/adhesive layer [G];

4-layer structure such as adhesive layer [G]/adhesive layer [G]/rigid resin layer [H]/adhesive layer [G], adhesive layer [G]/rigid resin layer [H]/rigid resin layer [H]/adhesive layer [G];

5-layer structure such as adhesive layer [G]/rigid resin layer [H]/adhesive layer [G]/rigid resin layer [H]/adhesive layer [G];

6-layer structure such as adhesive layer [G]/rigid resin layer [H]/adhesive layer [G]/adhesive layer [G]/rigid resin layer [H]/adhesive layer [G];

9-layer structure such as adhesive layer [G]/rigid resin layer [H]/adhesive layer [G]/adhesive layer [G]/rigid resin layer [H]/adhesive layer [G]/adhesive layer [G]/rigid resin layer [H]/adhesive layer [G]; and so on.

In a case where the interlayer film [J] is formed of a plurality of adhesive layers [G] and rigid resin layers [H], the interlayer film [J] having a plurality of layers may be formed by overlaying the glass sheet with the plurality of adhesive layers [G] and rigid resin layers [H] so as to join them together with the glass sheet, upon producing the laminated glass. In addition, the interlayer film [J], where the plurality of adhesive layers [G] and rigid resin layers [H] are already joined together, may be used. Further, the interlayer film [j], where the plurality of adhesive layers [G] and rigid resin layers [H] are already joined together, may be previously produced, and then the interlayer film [J] consisting of the multiple interlayer films [j] between the glass sheets may be formed to obtain the laminated glass.

The interlayer film [J] used in the present disclosure has a storage modulus value in dynamic viscoelastic properties, which is either calculated from the aforementioned formula 1 or measured, of normally $2.0 \times 10^8$ to $1.0 \times 10^9$ Pa, preferably $2.5 \times 10^8$ to $9.0 \times 10^8$ Pa, more preferably $3.0 \times 10^8$ to $8.0 \times 10^8$ Pa, particularly preferably $3.3 \times 10^8$ Pa or more, and particularly preferably $4.4 \times 10^8$ Pa or less at a temperature of −20° C. And at a temperature of 40° C., the storage modulus value of the interlayer film [J] is normally $1.0 \times 10^8$ to $8.0 \times 10^8$ Pa, preferably $1.3 \times 10^8$ to $7.0 \times 10^8$ Pa, more preferably $1.6 \times 10^8$ to $6.0 \times 10^8$ Pa, particularly preferably $2.2 \times 10^8$ Pa or more, and particularly preferably $2.4 \times 10^8$ Pa or less.

With the storage modulus of the interlayer film [J] falling within the above range, it is easier to maintain the rigidity with suppressing reduction in bending modulus of the laminated glass, as well as it is easier to prevent the glass from breaking in thermal shock by a sudden temperature change.

Thickness of the interlayer film [J] is normally from 0.1 to 10 mm, preferably 0.4 to 8 mm, and more preferably 0.7 to 6 mm.

When the thickness of the interlayer film [J] being in the above range, it is possible to reduce amount of scattered glass if the laminated glass should break on impact. Moreover, when the thickness of the interlayer film [J] is greater than the aforementioned range, there are risks that light transmittance of the laminated glass as a whole possibly reduces, or a larger amount of resin is possibly required for forming the interlayer film [J], resulting in less economical production.

(b) Adhesive Layer [G]

An adhesive layer [G] is a layer consisting of a transparent adhesive that mainly contains a thermoplastic elastomer having an alkoxysilyl group [F]. The adhesive layer [G] has adhesiveness and flexibility to the glass. Content of the thermoplastic elastomer having an alkoxysilyl group [F] in the adhesive layer [G] is usually 90% by weight or more, preferably 95% by weight or more, and more preferably 98% by weight or more, with respect to the whole adhesive layer [G].

(Storage Modulus of Adhesive Layer [G])

The adhesive layer [G] used in the present disclosure has a storage modulus, which is measured in dynamic viscoelastic properties, in a range of normally $1.0 \times 10^8$ to $7.0 \times 10^8$ Pa, preferably $1.3 \times 10^8$ to $6.0 \times 10^8$ Pa, more preferably $1.5 \times 10^8$ to $5.0 \times 10^8$ Pa at a temperature of −20° C.; and in a range of normally $0.50 \times 10^8$ to $6.0 \times 10^8$ Pa, preferably $0.70 \times 10^8$ to $5.0 \times 10^8$ Pa, more preferably $0.90 \times 10^8$ to $4.0 \times 10^8$ Pa at a temperature of 40° C.

With the storage modulus of the adhesive layer [G] falling within the above range, it is possible to maintain the rigidity with suppressing reduction in bending modulus of the laminated glass, as well as it is possible to prevent the adhered glass sheet from breaking in thermal expansion of the adhesive layer [G] by a temperature change.

(Thickness of Adhesive Layer [G])

Thickness of the adhesive layer [G] is normally from 0.01 to 3 mm, preferably 0.02 to 2 mm, and more preferably 0.04 to 1 mm.

When the thickness of the adhesive layer [G] being in the above range, it is possible to obtain sufficient adhesiveness between the interlayer film [J] and the glass sheet. Moreover, when the thickness of the adhesive layer [G] is greater than the aforementioned range, there are risks that a larger amount of the adhesive layer [G] is possibly used for producing the laminated glass, resulting in less economical production.

(Thermoplastic Elastomer Having an Alkoxysilyl Group [F])

Specific examples of a thermoplastic elastomer having an alkoxysilyl group [F], which is a main component of the adhesive layer [G], include macromolecules where the alkoxysilyl group(s) is introduced into a thermoplastic elastomer such as polystyrene-based elastomer, hydrogenated polystyrene-based elastomer, polyolefin-based elastomer, polyurethane-based elastomer, polyester-based elastomer, polyamide-based elastomer. These macromolecules are imparted with strong adhesiveness to the glass by the introduction of the alkoxysilyl group(s) into the thermoplastic elastomer.

These thermoplastic elastomers having an alkoxysilyl group [F] may be used alone or in combination. Among those listed above, hydrogenated polystyrene-based elastomer having an alkoxysilyl group is particularly preferable as it is easy to control the storage modulus of the adhesive layer [G] within a desirable range in a wide temperature range (e.g., −50 to 100° C.), as well as it has a low specific gravity and is excellent in performances such as transparency, light resistance, moisture resistance, and mechanical strength.

The thermoplastic elastomer having an alkoxysilyl group [F] can be produced by methods such as, for example, a method in which the alkoxysilyl group(s) is introduced into thermoplastic elastomers by copolymerizing monomers having the alkoxysilyl group(s) and other monomers in a step of synthesizing the thermoplastic elastomer; and a method in which thermoplastic elastomers are reacted with ethylenically unsaturated silane compounds having the alkoxysilyl group(s) in the presence of organic peroxides.

The amount of alkoxysilyl groups introduced is normally 0.2 to 5 parts by weight, preferably 0.4 to 4 parts by weight, more preferably 0.6 to 3 parts by weight, with respect to 100 parts by weight of the thermoplastic elastomer.

With the introduction amount of alkoxysilyl groups falling within the above range, the interlayer film [J] used in the present disclosure demonstrates firm adhesiveness to the glass. Moreover, with the aforementioned introduction amount, reduction in the adhesiveness to the glass due to progress of a condensation reaction between alkoxysilyl groups is suppressed so that the stable adhesiveness can be obtained even when the interlayer film [J] is stored for a long time at normal temperature and normal humidity.

(Modified Hydrogenated Block Copolymer [E])

Hydrogenated polystyrene-based elastomer having an alkoxysilyl group, particularly preferable among the thermoplastic elastomers having an alkoxysilyl group [F], is a modified hydrogenated block copolymer [E]. The modified hydrogenated block copolymer [E] is a result from introducing the alkoxysilyl group(s) into a hydrogenated block copolymer [D]. And the hydrogenated block copolymer [D] is obtained from hydrogenation of a block copolymer [C], the block copolymer [C] made of at least two polymer blocks [A] that mainly contains structural units derived from an aromatic vinyl compound and at least one polymer block [B] that mainly contains structural units derived from a chain conjugated diene compound.

(Polymer Block [A])

A polymer block [A] contains structural units derived from an aromatic vinyl compound as a main component. Content of the structural units derived from an aromatic vinyl compound in the polymer block [A] is normally 90% by weight or more, preferably 95% by weight or more, and more preferably 99% by weight or more. The polymer blocks [A] contained in the block copolymer [C] may be the same as or different from each other as long as they fall within the aforementioned range.

When the content of the structural units derived from an aromatic vinyl compound is excessively low in the polymer block [A], there is a concern that the heat resistance of the adhesive layer [J] may be reduced.

Specific examples of the aromatic vinyl compounds used for synthesizing the polymer block [A] include styrene; styrenes having an alkyl group(s) as a substituent(s) such as α-methylstyrene, 2-methylstyrene, 3-methyl styrene, 4-methyl styrene, 2,4-diisopropyl styrene, 2,4-dimethylstyrene, 4-t-butylstyrene, and 5-t-butyl-2-methylstyrene; styrenes having an alkoxy group(s) as a substituent(s) such as 4-methoxystyrene, and 3-methoxy-5-isopropoxystyrene; styrenes having a halogen atom(s) as a substituent(s) such as 4-monochlorostyrene, dichlorostyrene, and 4-monofluorostyrene; styrenes having an aryl group(s) as a substituent(s) such as 4-phenylstyrene. Among listed above, those containing no polar groups, for example, styrene, styrenes having an alkyl group(s) as a substituent(s), and styrenes having an aryl group(s) as a substituent(s) are preferable in terms of hygroscopicity. And styrene is particularly preferred in terms of industrial availability.

The polymer block [A] may include structural units derived from a chain conjugated diene compound and/or structural units derived from other vinyl compounds as components other than the structural units derived from an aromatic vinyl compound. Examples of the chain conjugated diene compounds and the other vinyl compounds include the same compounds as chain conjugated diene compounds and other vinyl compounds, as structural units for a polymer block [B] described below. Their content is normally 5% by weight or less, preferably 3% by weight or less, and more preferably 1% by weight or less.

When the content of the components other than the structural units derived from an aromatic vinyl compound is excessively high in the polymer blocks [A], there is a concern that the bending modulus of the presently disclosed laminated glass is possibly reduced and consequently the rigidity may not be able to be maintained.

(Polymer Block [B])

The polymer block [B] contains structural units derived from a chain conjugated diene compound as a main component. Content of the structural units derived from a chain conjugated diene compound in the polymer block [B] is normally 80% by weight or more, preferably 90% by weight or more, and more preferably 95% by weight or more.

With the content of the structural units derived from a chain conjugated diene compound falls within the above ranges, the presently disclosed laminated glass is excellent in thermal shock resistance as well as in adhesiveness between the interlayer film [J] and the glass sheet.

Chain conjugated diene-based compounds containing no polar groups, as the chain conjugated diene-based compounds used for synthesizing the polymer block [B], are preferable in terms of hygroscopicity. Specific examples of which are 1,3-butadiene, isoprene, 2,3-dimethyl-1,3-butadiene, and 1,3-pentadiene. Among those listed above, 1,3-butadiene and isoprene are particularly preferred in terms of industrial availability.

The polymer block [B] may include structural units derived from an aromatic vinyl compound and/or structural units derived from other vinyl compounds as components other than the structural units derived from the chain conjugated diene compound. Their content is normally 20% by weight or less, preferably 10% by weight or less, and more preferably 5% by weight or less.

When the content of the components other than the structural units derived from the chain conjugated diene compound is excessively high in the polymer block [B], there is a concern that the presently disclosed laminated glass may not be able to maintain the thermal shock resistance, and the adhesiveness between the interlayer film [J] and the glass sheet.

Examples of other vinyl-based compounds include chain vinyl compound, cyclic vinyl compound, unsaturated cyclic acid anhydride, and unsaturated imide compound. These compounds may have substituent(s) such as nitrile group, alkoxycarbonyl group, hydroxycarbonyl group, and halogen atoms. Among listed above, those containing no polar groups such as chain olefins having carbon numbers of 2 to 20 such as ethylene, propylene, 1-butene, 1-pentene, 1-hexene, 1-heptene, 1-octene, 1-nonene, 1-decene, 1-dodecene, 1-eicosene, 4-methyl-1-pentene, and 4,6-dimethyl-1-heptene; cyclic olefins having carbon numbers of 5 to 20 such as vinylcyclohexane, norbornene; cyclic diene compounds such as 1,3-cyclohexadiene, norbornadiene; are preferable from the perspective of hygroscopicity.

(Block Copolymer [C])

A block copolymer [C] is made of at least two polymer blocks [A] and at least one polymer block [B]. With denotations of wA as a weight fraction of a total amount of the polymer block [A] accounting for the block copolymer [C], and wB as a weight fraction of a total amount of the polymer block [B] accounting for the block copolymer [C], the block copolymer [C] has a ratio between wA and wB as wA:wB of normally 30:70 to 60:40, preferably 40:65 to 57:43, and more preferably 45:55 to 55:45. Moreover, the block copolymer [C] is made of at least two polymer blocks [A] mainly containing structural units derived from an aromatic vinyl compound and at least one polymer block [B] mainly containing structural units derived from a chain conjugated diene compound. And with denotations of xA as a weight fraction of the structural units derived from the aromatic vinyl compound accounting for the whole block copolymer [C], and xB as a weight fraction of the structural units derived from the chain conjugated diene compound accounting for the whole block copolymer [C], the block copolymer [C] has a ratio between xA and xB (xA:xB) of normally 30:70 to 60:40, preferably 40:65 to 57:43, and more preferably 45:55 to 55:45.

With the wA:wB (or the xA:xB) falling within the above range, the presently disclosed laminated glass is capable of suppressing reduction in bending modulus to maintain rigidity.

Number of the polymer blocks [A] in the block copolymer [C] is normally 3 or less, preferably 2, while the number of the polymer blocks [B] is normally 2 or less, and preferably one. Although block arrangements of the block copolymer [C] may be of either a chain-type block or a radial-type block, those of the chain-type block is preferred as is excellent in mechanical strength. Most preferred arrangement of the block copolymer [C] is a triblock copolymer of [A]-[B]-[A]-type where the polymer blocks [A] are bound to both ends of the polymer block [B]. The polymer blocks [A] may be the same as or different from each other. The polymer blocks [B] may be the same as or different from each other as well, if there is more than one polymer block [B].

Molecular weight of the block copolymer [C], measured as a weight-average molecular weight (Mw) in terms of polystyrene by means of gel permeation chromatography (GPC) using tetrahydrofuran (THF) as a solvent, is normally 35,000 to 200,000, preferably 38,000 to 150,000, and more preferably 40,000 to 100,000. In addition, molecular weight distribution (Mw/Mn) of the block copolymer [C] is preferably 3 or less, more preferably 2 or less, and particularly preferably 1.5 or less.

With the Mw and Mw/Mn falling within the above range, the adhesive layer [G] can have favorable mechanical strength and forming processability.

Without any particular limitations are placed on a production method for the block copolymer [C], any production methods conventionally known for block copolymers can be employed. For example, such methods include those described in WO2003/018656 and WO2011/096389.

(Hydrogenated Block Copolymer [D])

A hydrogenated block copolymer [D] is obtainable by hydrogenating the block copolymer [C]. The hydrogenated block copolymer [D] may be a macromolecule either where only carbon-carbon unsaturated bonds in main and side chains derived from the chain conjugated diene compound of the block copolymer [C] are selectively hydrogenated, or where carbon-carbon unsaturated bonds in main and side chains derived from the chain conjugated diene compound as well as carbon-carbon unsaturated bonds in aromatic rings derived from the aromatic vinyl compound of the block copolymer [C] are hydrogenated.

In a situation where only the carbon-carbon unsaturated bonds in main and side chains derived from the chain conjugated diene compound of the block copolymer [C] are selectively hydrogenated, percent hydrogenation of the carbon-carbon unsaturated bonds in main and side chains is normally 95% or more, preferably 97% or more, and more preferably 99% or more. And the percent hydrogenation of the carbon-carbon unsaturated bonds in aromatic rings derived from the aromatic vinyl compound is normally 10% or less, preferably 5% or less, and more preferably 3% or less.

With the percent hydrogenation falling within the above range, the hydrogenated block copolymer [D] having favorable thermal degradation resistance can be obtained.

In seeking the percent hydrogenation of the hydrogenated block copolymer [D], the percent hydrogenation of the carbon-carbon unsaturated bonds derived from the chain conjugated diene compound as well as the percent hydrogenation of the carbon-carbon unsaturated bonds derived from the aromatic vinyl compound can be respectively obtained by measuring 1H-NMR for the hydrogenated block copolymer [D].

In a situation where carbon-carbon unsaturated bonds in main and side chains derived from the chain conjugated diene compound as well as carbon-carbon unsaturated bonds in aromatic rings derived from the aromatic vinyl compound of the block copolymer [C] are hydrogenated, the percent hydrogenation is 95% or more, preferably 97% or more, and more preferably 99% or more of all the carbon-carbon unsaturated bonds.

It is particularly preferable that the percent hydrogenation falls within the above range, as the adhesive layer [G] can be excellent in transparency, thermal degradation resistance, and light resistance, as well as the adhesive layer [G] can have higher thermal deformation resistance in comparison with the hydrogenated block copolymer [D] where only the carbon-carbon unsaturated bonds derived from the chain conjugated diene compound are selectively hydrogenated.

Without any particular limitations are placed on a hydrogenation method, a reaction scheme, and the like for the unsaturated bonds in the block copolymer [C], any known methods may be used.

No particular limitations are placed on a selective hydrogenation method of the carbon-carbon unsaturated bonds in main and side chains derived from the chain conjugated diene compound of the block copolymer [C]. Such methods include known hydrogenation methods described, for example, in JP2015-78090A.

Moreover, no particular limitations are placed on a hydrogenation method of the carbon-carbon unsaturated bonds in main and side chains derived from the chain conjugated diene compound as well as the carbon-carbon unsaturated bonds in aroma rings derived from the aromatic vinyl compound of the block copolymer [C]. However, hydrogenation methods capable of achieving higher percent hydrogenation and of involving less polymer cleavage reactions are preferable. Examples of such hydrogenation methods include methods described, for example, in WO2011/096389 and WO2012/043708.

After completion of the hydrogenation reaction, the hydrogenated block copolymer [D] can be recovered by removing a hydrogenation catalyst, or a hydrogenation catalyst and a polymerization catalyst from a reaction solution, and then by removing a solvent from the resultant solution.

The recovered hydrogenated block copolymer [D] is usually pelletized and can be subjected to a subsequent forming process.

Molecular weight of the hydrogenated block copolymer [D], measured as a weight-average molecular weight (Mw) in terms of polystyrene by means of GPC using THF as a solvent, is normally 35,000 to 200,000, preferably 38,000 to 150,000, and more preferably 40,000 to 100,000. In addition, molecular weight distribution (Mw/Mn) of the hydrogenated block copolymer [D] is preferably 3 or less, more preferably 2 or less, and particularly preferably 1.5 or less.

With the Mw and Mw/Mn controlled to fall within the above range, the adhesive layer [G] used in the present disclosure can have favorable mechanical strength and forming processability.

(Modified Hydrogenated Block Copolymer [E])

A modified hydrogenated block copolymer [E] is obtained by introducing the alkoxysilyl group(s) into the hydrogenated block copolymer [D]. The amount of alkoxysilyl groups introduced is normally 0.2 to 5 parts by weight, preferably 0.4 to 4 parts by weight, more preferably 0.6 to 3 parts by weight, particularly preferably 1.5 parts by weight or more, and particularly preferably 2.5 parts by weight or less, with respect to 100 parts by weight of the hydrogenated block copolymer [D].

With the introduction amount of alkoxysilyl groups falling within the above range, the adhesive layer [G] demonstrates firm adhesiveness to the glass sheet. When the introduction amount of alkoxysilyl groups is excessively large, cross-links are promoted between the alkoxysilyl groups that were decomposed by trace amount of water and the like, during storage of the resultant modified hydrogenated block copolymer [E]. This may result in reduction in adhesiveness of an adhesive, when the resultant modified hydrogenated block copolymer [E] is used as the adhesive.

Examples of the alkoxysilyl groups to be introduced include tri(alkoxy having carbon numbers of 1 to 6)silyl groups such as trimethoxysilyl group and triethoxysilyl group; (alkyl having carbon numbers of 1 to 20)di(alkoxy having carbon numbers of 1 to 6)silyl groups such as methyldimethoxysilyl group, methyldiethoxysilyl group, ethyldimethoxysilyl group, ethyldiethoxysilyl group, propyldimethoxysilyl group, and propyldiethoxysilyl group; and (aryl)di(alkoxy having carbon numbers of 1 to 6)silyl groups such as phenyldimethoxysilyl group and phenyldiethoxysilyl group.

Alkoxysilyl groups may be bound to the hydrogenated block copolymer [D] via divalent organic groups such as alkylene groups having carbon numbers of 1 to 20 and alkyleneoxycarbonylalkylene groups having carbon numbers of 2 to 20.

The modified hydrogenated block copolymer [E] can be produced according to known methods. Such methods include methods described, for example, in WO2012/043708, WO2013/176258 and JP2015-78090A.

More specifically, the modified hydrogenated block copolymer [E] can be obtained by reacting the aforementioned hydrogenated block copolymer [D] with ethylenically unsaturated silane compounds in the presence of organic peroxides.

The ethylenically unsaturated silane compounds to be used are not particularly limited as long as they are capable of graft-polymerizing with the hydrogenated block copolymer [D] so as to introduce the alkoxysilyl groups into the hydrogenated block copolymer [D]. For instance, vinyltrimethoxysilane, vinyltriethoxysilane, allyltrimethoxysilane, allyltriethoxysilane, dimethoxymethylvinylsilane, diethoxymethylvinylsilane, p-styryltrimethoxysilane, 3-acryloxypropyltrimethoxysilane, 3-acryloxypropyltriethoxysilane, 3-methacryloxypropyltrimethoxysilane, 3-methacryloxypropyltriethoxysilane, 3-methacryloxypropylmethyldimethoxysilane, 3-methacryloxypropylmethyldiethoxysilane, and 3-acryloxypropyltrimethoxysilane are suitably used. These ethylenically unsaturated silane compounds may be used alone or in combination.

The amount of the ethylenically unsaturated silane compounds to be used is normally 0.25 parts by weight to 10 parts by weight, preferably 0.5 parts by weight to 8 parts by weight, and more preferably 0.7 parts by weight to 6 parts by weight, with respect to 100 parts by weight of the hydrogenated block copolymer [D].

The organic peroxides having a half life temperature for 1 minute in a range of 170 to 190° C. are preferably used for the graft polymerization.

Examples of the organic peroxides suitably used include, for instance, t-butylcumyl peroxide, dicumyl peroxide, di-t-hexyl peroxide, 2,5-dimethyl-2,5-di(t-butylperoxy)hexane, di-t-butyl peroxide, and di(2-t-butylperoxyisopropyl)benzene.

These organic peroxides may be used alone or in combination.

The amount of the organic peroxides to be used is normally 0.05 to 2 parts by weight, preferably 0.1 to 1 part by weight, and more preferably 0.2 to 0.5 parts by weight, with respect to 100 parts by weight of the hydrogenated block copolymer [D].

With amount of the organic peroxides used within the above range, it is possible to introduce the alkoxysilyl groups of a desired amount into the hydrogenated block copolymer [D], as well as to suppress molecular weight of the hydrogenated block copolymer from significantly reducing.

Methods for reacting the hydrogenated block copolymer [D] with ethylenically unsaturated silane compounds in the presence of peroxides are not limited. Alkoxysilyl groups can be introduced into the hydrogenated block copolymer [D], for example, by kneading a mixture consisting of the hydrogenated block copolymer [D], ethylenically unsaturated silane compounds, and peroxides in a molten state for a desired period of time by means of a twin-screw kneader.

Kneading temperature in the twin-screw kneader is normally 180 to 220° C., preferably 185 to 210° C., and more preferably 190 to 200° C. Kneading time under heating is normally about 0.1 to 10 minutes, preferably about 0.2 to 5 minutes, more preferably about 0.3 to 2 minutes, particularly preferably 60 seconds or more, and particularly preferably 70 seconds or less.

The kneading and extruding may be performed continuously within the aforementioned ranges of the kneading temperature under heating as well as the kneading time under heating (residence time).

Molecular weight of the modified hydrogenated block copolymer [E] is substantially the same as the molecular weight of the hydrogenated block copolymer [D] used as a raw material, as the amount of alkoxysilyl groups to be introduced is small.

On the other hand, cross-linking reactions and cleavage reactions of the polymer take place simultaneously in reacting with ethylenically unsaturated silane compounds in the presence of organic peroxides. This results in higher molecular weight distribution value of the modified hydrogenated block copolymer [E].

Molecular weight of the modified hydrogenated block copolymer [E], measured as a weight-average molecular weight (Mw) in terms of polystyrene by means of GPC using THF as a solvent, is normally 35,000 to 200,000, preferably 38,000 to 150,000, and more preferably 40,000 to 100,000. In addition, molecular weight distribution (Mw/Mn) is preferably 3.5 or less, more preferably 2.5 or less, and particularly preferably 2.0 or less.

With the Mw and Mw/Mn controlled to fall within the above range, the adhesive layer [G] can have favorable mechanical strength and forming process ability.

(Additive)

The adhesive layer [G] mainly contains the thermoplastic elastomer having an alkoxysilyl group [F], more preferably the modified hydrogenated block copolymer [E] having an alkoxysilyl group. And the adhesive layer [G] is a layer made of an adhesive composition obtainable by blending additives that are generally blended into an adhesive mainly containing resin.

Examples of the additives include tackifiers and adhesion promotors for adjusting adhesiveness with glass, ultraviolet absorbers for shielding from ultra violet, antioxidants for improving processability and so on, and light stabilizers for improving durability.

Hydrocarbon-based polymers having number-average molecular weight of 300 to 5,000 are preferred for the tackifiers. Specific examples of the tackifiers include low molecular weight substances and hydrogenated products thereof such as polyisobuthylene, polybutene, poly-4-methylpentene, poly-1-octene, ethylene, and α-olefin copolymer; low molecular weight substances and hydrogenated products thereof such as polyisoprene and polyisoprene-butadiene copolymer; and the like. Among these listed above, hydrogenated polyisobuthylene of low molecular weight and hydrogenated polyisoprene of low molecular weight are particularly preferred from the view point of being able to maintain transparency and light resistance as well as excellent in a softening effect.

The amount of the tackifiers to be blended is normally 10 parts by weight or less, preferably 7 parts by weigh or less, and more preferably 5 parts by weight or less, with respect to 100 parts by weight of the thermoplastic elastomer having an alkoxysilyl group [F].

When the blending amount of the tackifiers is excessively large, there is a concern that bending modulus of the presently disclosed laminated glass may be reduced and consequently rigidity may not be able to be maintained.

Examples of the adhesion promotors include petroleum resins and hydrogenated products thereof such as 1,3-pentadiene-based petroleum resin, cyclopentadiene-based petroleum resin, and styrene-indene-based petroleum resin; silane coupling agents such as vinyl silane-based, epoxy silane-based, acrylic silane-based, and amino silane-based.

The amount of the adhesion promotors to be blended is normally 10 parts by weight or less, preferably 7 parts by weigh or less, and more preferably 5 parts by weight or less, with respect to 100 parts by weight of the thermoplastic elastomer having an alkoxysilyl group [F].

When the blending amount of the adhesion promotors is excessively large, a concern may arise that bending modulus of the presently disclosed laminated glass is reduced and as a consequence rigidity cannot be maintained.

Examples of the ultraviolet absorbers that can be used include oxybenzophonone-based compounds, benzotriazole-based compounds, esters of salicylic acid-based compounds, benzophenone-based compounds, benzotriazole-based compounds, and triazine-based compounds.

Examples of the antioxidants that can be used include phosphoric antioxidants, phenolic antioxidants, and sulfuric antioxidants.

Examples of light stabilizers that can be used include hindered amine light stabilizers.

The additives such as ultraviolet absorbers, antioxidants, and light stabilizers, that are blended in the thermoplastic elastomer having an alkoxysilyl group [F] may be used each alone or in combination of two or more types.

Amounts of the ultraviolet absorbers, antioxidants, light stabilizers to be blended, as required, are normally 5 parts by weight or less, preferably 3 parts by weigh or less, and more preferably 2 part by weight or less, with respect to 100 parts by weight of the thermoplastic elastomer having an alkoxysilyl group [F].

Commonly known methods generally used for producing resin compositions can be applied to methods for blending the additives in the thermoplastic elastomer having an alkoxysilyl group [F]. Such methods include, for example, a method for producing an adhesive composition, mainly containing the thermoplastic elastomer having an alkoxysilyl group [F], with the additives blended therein by uniformly mixing the additives into pellets of the thermoplastic elastomer having an alkoxysilyl group [F], then melt mixing the mixture by means of a continuous melt kneader such as a twin-screw extruder, and then extruding the mixture into pellets; a method for producing an adhesive composition by adding and uniformly mixing the additives into the thermoplastic elastomer having an alkoxysilyl group [F] during melt kneading thereof by means of a twin-screw extruder and the like.

(Method for Forming Adhesive Layer [G])

Without any particular limitations are placed on a forming method for the adhesive layer [G], known methods such as melt extrusion shaping technique, multilayer coextrusion shaping technique, extrusion lamination technique, and thermal lamination technique are applicable.

In an example case of forming the adhesive layer [G] of a single layer consisting of an adhesive composition, the adhesive composition mainly containing the thermoplastic elastomer having an alkoxysilyl group [F], by the melt extrusion shaping technique, resin can be set in a temperature range of normally 180 to 240° C., preferably 190 to 230° C., more preferably 200 to 220° C. to be formed into a sheet-like shape.

It will possibly be industrially disadvantageous when the temperature of resin being excessively low, as a speed of extruding the adhesive layer [G] cannot be increased due to poorer fluidity. When the temperature of resin being excessively high, there is a risk that adhesiveness of the adhesive layer [G] to glass, after the adhesive layer [G] having been stored for a long period of time, may be reduced. This is because the formed adhesive layer [G] may have a poorer adhesiveness to a glass surface, or have a lower storage stability, when the temperature of resin being excessively high.

In a case where the thermoplastic elastomer having an alkoxysilyl group [F] is the aforementioned hydrogenated block copolymer [E] having an alkoxysilyl group, cut-off pieces coming from width adjustment of the extruded sheet can be reused for forming the adhesive layer [G], as almost no coloration or thermal degradation is observed through the melt extrusion shaping.

(c) Rigid Resin Layer [H]

A rigid resin layer [H] is a layer made of transparent thermoplastic resin having a storage modulus higher than that of the adhesive layer [G]. Total light transmittance of the rigid resin layer [H] is normally 80% or more, preferably 85% or more, and more preferably 90% or more.

Content of the thermoplastic resin in the rigid resin layer [H] is normally 90% by weight or more, preferably 95% by weight or more, and more preferably 98% by weight or more, with respect to the whole rigid resin layer [H].

(Storage Modulus of Rigid Resin Layer [H])

The rigid resin layer [H] used in the present disclosure is a resin layer having a storage modulus, as measured in dynamic viscoelastic properties, of greater value than the storage modulus of the adhesive layer [G].

The storage modulus of the rigid resin layer [H] is normally $3.0\times10^8$ Pa or more, preferably $3.5\times10^8$ Pa or more, more preferably $3.9\times10^8$ Pa or more at a temperature of $-20°$ C.; and normally $2.0\times10^8$ Pa or more, preferably $2.5\times10^8$ Pa or more, more preferably $3.0\times10^8$ Pa or more at a temperature of 40° C.

With the storage modulus of the rigid resin layer [H] falling within the above range, it is easier to maintain rigidity with enhancing bending modulus of the laminated glass.

The storage modulus of the adhesive layer and the rigid resin layer can be obtained as storage modulus values at $-20°$ C. and 40° C. from measured values of viscoelastic properties by means of a known viscoelasticity measurement apparatus according to JIS K7244-2 (Plastics-Determination of dynamic mechanical properties-Part2: Torsion-pendulum method) under the conditions of angular frequency of 1 rad/s, measurement temperature range from $-100$ to $+150°$ C., and heating rate of 5° C./min.

(Thickness of Rigid Resin Layer [H])

Thickness of the rigid resin layer [H] is normally from 0.05 to 5 mm, preferably 0.1 to 4 mm, more preferably 0.2 to 3 mm, particular preferably 0.5 mm or more, and particularly preferably 1 mm or less.

With the thickness of the rigid resin layer [H] falling within the above range, it is easier to maintain rigidity with enhancing bending modulus of the laminated glass, as well as workability in producing the laminated glass becomes easier.

(Thermoplastic Resin)

Thermoplastic resin that composes the rigid resin layer [H] is preferably resin having transparency, heat resistance for 100° C. or more, light resistance, and low hygroscopicity, in addition to the storage modulus described above.

Specific examples of such resin include hydrogenated block copolymers in which carbon-carbon unsaturated bonds derived from a conjugated diene compound as well as carbon-carbon unsaturated bonds derived from an aromatic vinyl compound of a block copolymer are hydrogenated, the block copolymer made of aromatic vinyl compounds such as styrene, α-methylstyrene and vinylnaphthalene, and chain conjugated diene compounds such as butadiene and isoprene; polycarbonate resin such as bisphenol A polycarbonate, bisphenol Z polycarbonate and bisphenol AP polycarbonate; polyester resin such as polyethylene terephthalate, polyethylene naphthalate and poly-1,4-cyclohexylenedimethylene terephthalate; polystyrene-based resin such as styrene-acrylonitrile copolymer, styrene-methyl methacrylate copolymer; poly(meth)acrylic acid ester-based resin such as poly methyl methacrylate and poly methyl methacrylate-butyl acrylate block copolymer.

The rigid resin layer [H] is formed of at least one resin selected from these thermoplastic resins listed above.

Among such resins, hydrogenated block copolymers, bisphenol A polycarbonate and polyethylene terephthalate are preferred from the viewpoint of excellent impact resistance, and hydrogenated block copolymers are particularly preferred from the viewpoint of low density as well as physical properties well balanced between heat resistance, light resistance, moisture resistance, impact resistance, and so on.

(Hydrogenated Block Copolymer [S])

A hydrogenated block copolymer made of aromatic vinyl compounds and chain conjugated diene compounds, being particularly preferable among the transparent thermoplastic resins, is a macromolecule obtainable by hydrogenating carbon-carbon unsaturated bonds in main and side chains as well as carbon-carbon unsaturated bonds in aromatic rings of a block copolymer [R]. The block copolymer [R] is made of at least two polymer blocks [P] and at least one polymer block [Q], the polymer block [P] mainly containing structural units derived from an aromatic vinyl compound while the polymer block [Q] mainly containing structural units derived from a chain conjugated diene compound.

(Polymer Block [P])

A polymer block [P] contains structural units derived from an aromatic vinyl compound as a main component. Content of the structural units derived from an aromatic vinyl compound in the polymer block [P] is normally 90% by weight or more, preferably 95% by weight or more, and more preferably 99% by weight or more.

When the content of the structural units derived from an aromatic vinyl compound is excessively low in the polymer block [P], there is a concern that storage modulus of the rigid resin layer [H] is possibly reduced, and as a consequence, the laminated glass may not be able to maintain its rigidity.

Examples of the aromatic vinyl compounds used for synthesizing the polymer block [P] include the same compounds as used for synthesizing the polymer block [A] described above.

Further, the same chain conjugated diene compounds and/or other vinyl compounds as those for the aforementioned polymer block [A] may be used as components other than the aromatic vinyl compounds. Percentage of using the aromatic vinyl compounds, chain conjugated diene compounds and other vinyl compounds is the same as in the case for the polymer block [A].

(Polymer Block [Q])

A polymer block [Q] contains structural units derived from a chain conjugated diene compound as a main component. Content of the structural units derived from a chain conjugated diene compound in the polymer block [Q] is normally 80% by weight or more, preferably 90% by weight or more, and more preferably 95% by weight or more.

When the content of the structural units derived from a chain conjugated diene compound is excessively low in the polymer block [Q], there is a risk that flexibility and impact resistance of the rigid resin layer [H] may be reduced.

Examples of the chain conjugated diene compounds used for synthesizing the polymer block [Q] include the same compounds as used for synthesizing the polymer block [B] described above.

Further, the same aromatic vinyl compounds and/or other vinyl compounds as those for the aforementioned polymer block [B] may be used as components other than the chain conjugated diene compounds. Percentage of using the chain conjugated diene compounds, aromatic vinyl compounds and other vinyl compounds is the same as in the case for the polymer block [B].

(Block Copolymer [R])

A block copolymer [R] is made of at least two polymer blocks [P] and at least one polymer block [Q]. With denotations of wP as a weight fraction of a total amount of the polymer block [P] accounting for the block copolymer [R], and wQ as a weight fraction of a total amount of the polymer block [Q] accounting for the block copolymer [R], the block copolymer [R] has a ratio between wP and wQ as wP:wQ of normally 50:50 to 70:30, preferably 53:47 to 67:33, and more preferably 55:45 to 65:35.

With the wP:wQ falling within the above range, the presently disclosed laminated glass can maintain rigidity more easily with enhancing bending modulus.

Number of the polymer blocks [P] in the block copolymer [R] is normally 3 or less, preferably 2, while the number of the polymer blocks [Q] is normally 2 or less, and preferably one. Although block arrangements of the block copolymer [R] may be of either a chain-type block or a radial-type block, those of the chain-type block is preferred as is excellent in mechanical strength. Most preferred arrangement of the block copolymer [R] is a triblock copolymer of [P]-[Q]-[P]-type where the polymer blocks [P] are bound to both ends of the polymer block [Q]. The polymer blocks [P] may be the same as or different from each other. The polymer blocks [Q], if there are multiple polymer blocks [Q], may be the same as or different from each other as well.

Molecular weight of the block copolymer [R], measured as a weight-average molecular weight (Mw) in terms of polystyrene by means of gel permeation chromatography (GPC) using tetrahydrofuran (THF) as a solvent, is normally 40,000 to 200,000, preferably 45,000 to 150,000, and more preferably 50,000 to 100,000.

In addition, molecular weight distribution (Mw/Mn) of the block copolymer [R] is preferably 3 or less, more preferably 2 or less, and particularly preferably 1.5 or less.

With the Mw and Mw/Mn falling within the above range, the rigid resin layer [H] can have favorable mechanical strength and forming processability.

Without any particular limitations are placed on a production method for the block copolymer [R], the block copolymer [R] can be produced in the same manner as in the production method for the aforementioned block copolymer [C].

(Hydrogenated Block Copolymer [S])

A hydrogenated block copolymer [S] is a macromolecule obtainable by hydrogenating 95% or more, preferably 97% or more, more preferably 99% or more of carbon-carbon unsaturated bonds in main and side chains as well as of carbon-carbon unsaturated bonds in aromatic rings of a block copolymer [R].

Percent hydrogenation of the hydrogenated block copolymer [S] can be obtained by the same method as for the hydrogenated block copolymer [D].

With the percent hydrogenation falling within the above range, the rigid resin layer [H] can be excellent in transparency and light resistance.

Without any particular limitations are placed on a hydrogenation method, a reaction scheme, and the like for the unsaturated bonds in the block copolymer [R], the hydrogenated block copolymer [S] can be produced in the same manner as in the production method for the aforementioned hydrogenated block copolymer [D].

Molecular weight of the hydrogenated block copolymer [S], measured as a weight-average molecular weight (Mw) in terms of polystyrene by means of GPC using THF as a solvent, is normally 40,000 to 200,000, preferably 45,000 to 150,000, and more preferably 50,000 to 100,000. In addition, molecular weight distribution (Mw/Mn) of the hydrogenated block copolymer [S] is to be controlled to preferably 3 or less, more preferably 2 or less, and particularly preferably 1.5 or less.

When the Mw and Mw/Mn being within the above range, the rigid resin layer [H] can have favorable mechanical strength and forming processability.

After completion of the hydrogenation reaction, the hydrogenated block copolymer [S] can be recovered in the same manner as in the case for the aforementioned hydrogenated block copolymer [D].

The recovered hydrogenated block copolymer [S] is usually pelletized and can be subjected to a subsequent forming process.

(Method for Forming Rigid Resin Layer [H])

Without any particular limitations are placed on a forming method for the rigid resin layer [H], known methods such as melt extrusion shaping technique, multilayer coextrusion shaping technique, extrusion lamination technique, and thermal lamination technique are applicable.

In an example case of forming the rigid resin layer [H] of a single layer consisting of the thermoplastic resin by the melt extrusion shaping technique, resin can be set in a temperature range of normally 200 to 300° C., preferably 210 to 290° C., more preferably 220 to 280° C. to be formed into a sheet-like shape.

It will possibly be industrially disadvantageous when the temperature of resin being excessively low, as a speed of extruding the rigid resin layer [H] cannot be increased due to poorer fluidity. When the temperature of resin being excessively high, there is a risk that thermal degradation may go on within the resin in the shaping.

The rigid resin layer [H] to be produced may be a single layer sheet, a multilayer sheet, or a sheet where the adhesive layer [G] is laid onto one side or both sides of the rigid resin layer [H]. In addition, the rigid resin layer [H] may be a result of the same resins or different resins being stacked to form a multilayer.

In a situation where an ultra-multilayer polyester sheet is used, for example, it is possible to impart high penetration resistance while maintaining rigidity of the laminated glass. If no adhesive layers [G] are laid onto the rigid resin layer [H], in producing the laminated glass, the rigid resin layer [H] and the adhesive layer [G] can be placed in contact one another and stacked to form into the laminated glass.

(d) Laminated Glass

A laminated glass of the present disclosure is a laminated glass in which an interlayer film [J] is provided between a plurality of glass sheets and they are adhered together.

A mean density of the presently disclosed laminated glass is normally 1.2 to 1.5 g/cm³, preferably 1.20 to 1.46 g/cm³, more preferably 1.25 to 1.45 g/cm³, and particularly preferably 1.3 to 1.4 g/cm³ at a temperature of 25° C.

On one hand, the mean density will be about 2.3 g/cm³ for a laminated glass, for example, where a glass sheet of 2.1 mm in thickness, which is common in laminated glass for automobile windows, is stuck with a polyvinyl butyral-based interlayer film of 0.76 mm in thickness.

The presently disclosed laminated glass, on the other hand, has lower mean density of about two-thirds or less compared with general laminated glass for automobile windows. Therefore, the laminated glass of the present disclosure is advantageous for weight reduction.

The presently disclosed laminated glass, in addition to the lower mean density compared with the general laminated glass for automobile windows, characteristically has the rigidity maintained to be equal to or greater than that of the general laminated glass. The rigidity of the laminated glass is expressed, for example, in magnitude of a warp occurred in the laminated glass when applied with bending stress, and the rigidity depends on bending modulus and thickness of the laminated glass. In order to reduce weight of the laminated glass, it is desirable to lower the mean density while maintaining the bending modulus of the laminated glass and yet without increasing the total thickness of the laminated glass.

The bending modulus will be about $11 \times 10^9$ Pa for the aforementioned general laminated glass where a glass sheet of 2.1 mm in thickness, which is common in laminated glass for automobile windows, is stuck with a polyvinyl butyral-based interlayer film of 0.76 mm in thickness.

The bending modulus of the laminated glass described herein refers to bending modulus measured according to a four-point flexural test method provided in JIS R1602-1995 (Testing methods for elastic modulus of fine ceramics).

The laminated glass of the present disclosure is to realize the low mean density by utilizing the interlayer film [J] having the storage modulus within a specified range, as well as to realize the weight reduction by maintaining the rigidity to be equal to or greater than that of general laminated glass for automobile windows.

In addition, the laminated glass of the present disclosure is to maintain stable adhesiveness with glass in a wide temperature range of about −20° C. to about 40° C. so as to provide an effect to reduce an amount of scattered glass when the glass was broken on impact.

Thickness of the glass sheet used in the present disclosure is normally 0.5 to 9 mm, preferably 0.6 mm to 8 mm, more preferably 0.7 mm to 7 mm, particularly preferably 0.8 to 1.4 mm. The plurality of glass sheets used for producing the laminated glass may have the same or different thickness.

Glass sheets with different thickness can be used, for example, as in 1.1 mm-thick glass sheet/2.28 mm-thick interlayer film [J]/0.5 mm-thick glass sheet.

Examples of material of the glass sheet used in the present disclosure include, without limiting to, aluminosilicate glass, aluminoborosilicate glass, uranium glass, potash glass, silicate glass, crystallized glass, germanium glass, quarts glass, soda glass, white-plate glass, lead glass, barium borosilicate glass, and borosilicate glass. In addition, heat reflective glass and infrared reflective glass where an extremely thin metal film or metal oxide film is formed on their surfaces, colored glass, float glass that is widely used, thermally tempered glass, chemically strengthened glass, and so on can be used as well.

The presently disclosed laminated glass is formed of at least two glass sheets and an interlayer film [J] sandwiched between mutual joined surfaces of these glass sheets.

Layer structure of the presently disclosed laminated glass is not particularly limited. Examples of such layer structure include those composed of multiple glass sheets and a single or multiple interlayer films [J] such as, for instance, glass sheet/interlayer film [J$_1$]/glass sheet, glass sheet/interlayer film [J$_1$]/interlayer film [J$_1$]/glass sheet, glass sheet/interlayer film [J$_1$]/interlayer film [J$_2$]/interlayer film [J$_1$]/glass sheet, glass sheet/interlayer film [J$_1$]/glass sheet/interlayer film [J$_2$]/glass sheet, glass sheet/interlayer film [J$_1$]/glass sheet/interlayer film [J$_2$]/glass sheet/interlayer film [J$_3$]/glass sheet, where [J$_1$], [J$_2$] and [J$_3$] each represents the adhesive layer having the same or different compositions and/or layer structure.

Figure 2:
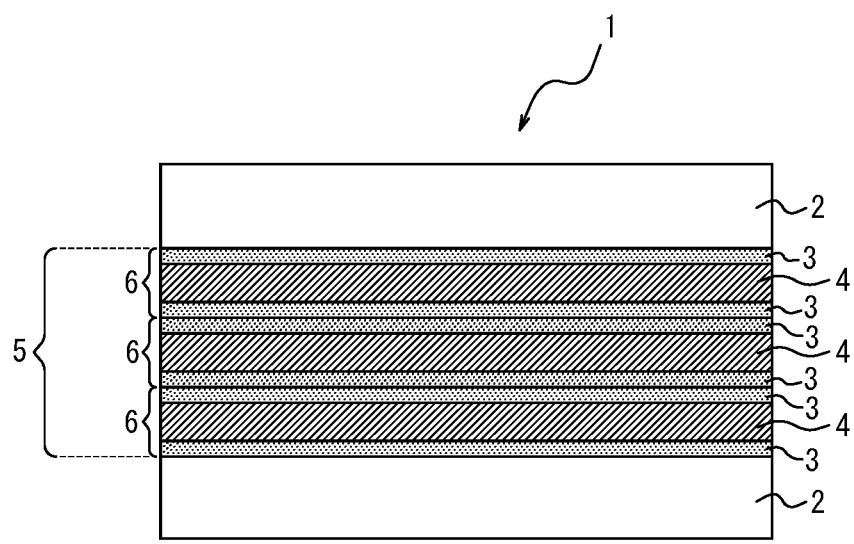
FIG. 2 illustrates a sectional view of another example of the laminated glass according to the present disclosure.

Specific examples of the presently disclosed laminated glass are illustrated in FIG. 1 and FIG. 2.

FIG. 1 is a sectional view according to one example of the laminated glass produced by stacking an adhesive layer [G], a rigid resin layer [H], an adhesive layer [G], a rigid resin layer [H], and an adhesive layer [G], in the order above, so as to be sandwiched between two glass sheets, and followed by joining them together.

In FIG. 1, the laminated glass is designated as 1, the glass sheet as 2, the adhesive layer [G] as 3, the rigid resin layer [H] as 4, and the interlayer film [J] as 5. Multiple glass sheets, multiple adhesive layers [G], and multiple rigid resin layers [H] may be the same as or different from one another, respectively.

FIG. 2 is a sectional view according to one example of the laminated glass produced by stacking three sheets of multilayered interlayer films [j], each multilayered interlayer film [j] having three-layered structure of adhesive layer [G]/rigid resin layer [H]/adhesive layer [G], to form an interlayer film [J] between two glass sheets.

In FIG. 2, the laminated glass is designated as 1, the glass sheet as 2, the adhesive layer [G] as 3, the rigid resin layer [H] as 4, the interlayer film [J] as 5, and the multilayered interlayer film [j] prepared by stacking layers beforehand as 6, wherein 5 represents the interlayer film [J] composed of three interlayer films [j]. Multiple glass sheets, multiple adhesive layers [G], multiple rigid resin layers [H], and multiple interlayer films [j] may be the same as or different from one another, respectively.

The glass sheet and the interlayer film [J], or the adhesive layer [G] and the rigid resin layer [H], used in the present disclosure, can be stuck firmly by pressure bonding them at a temperature of normally 120 to 180° C., preferably 130 to 160° C., and more preferably 135 to 150° C.

No particular limitations are placed on a method for producing the presently disclosed laminated glass. Examples of such method include, for example, a method where multiple glass sheets and an interlayer film [J] sandwiched between the glass sheets are stacked, degassed in a resin bag which is capable of depressurize and heat resistant, and then adhered under heat and pressure by means of an autoclave; a method where those stacked as above are heated in an oven while being degassed in a resin bag capable of depressurize and heat resistant; a method where those stacked as above are adhered under heat and reduced pressure by means of a vacuum laminator; and the like.

Moreover, other methods are also applicable such as a method where each of the adhesive layer [G] and the rigid resin layer [H], as components of the interlayer film [J], are formed separately, and they are stacked, for example, as glass sheet/adhesive layer [G]/rigid resin layer [H]/adhesive layer [G]/glass sheet, glass sheet/adhesive layer [G]/rigid resin layer [H]/rigid resin layer [H]/adhesive layer [G]/glass sheet, or glass sheet/adhesive layer [G]/rigid resin layer [H]/adhesive layer [G]/rigid resin layer [H]/adhesive layer [G]/glass sheet, and they are then joined together using the aforementioned methods to produce the laminated glass; a method where the multilayered interlayer film [j], in which the adhesive layer [G] and the rigid resin layer [H] are struck in advance, for example, as the adhesive layer [G]/rigid resin layer [H]/adhesive layer [G], is produced beforehand, and they are stacked, for example, as glass sheet/multilayered interlayer film [j]/multilayered interlayer film [j]/glass sheet, glass sheet/multilayered interlayer film [j]/multilayered interlayer film [j]/multilayered interlayer film [j]/glass sheet, or glass sheet/multilayered interlayer film [j]/rigid resin layer [H]/multilayered interlayer film [j]/glass sheet, and they are then joined together using the aforementioned methods to produce the laminated glass; and so forth.

The laminated glass of the present disclosure can maintain the rigidity to be equal to or greater than that of the general laminated glass for automobile windows, as well as being excellent in lightness, in addition to being excellent in heat resistance, light resistance, moisture resistance, and so on. The presently disclosed laminated glass is therefore useful as window materials and roofing materials for automobiles; as well as window materials, roofing materials, flooring materials, wall materials and partition materials for buildings; window materials for electric vehicle s; sound insulating window materials; heat insulating window materials; window materials for watercrafts and aircrafts; materials for observation decks; surface protection materials for liquid crystal displays and organic EL displays; window materials for railway platform screen doors; noise barriers for roads; surface protective covers for solar cells; protective covers for lighting equipment; window materials for armored vehicles; and so on.

EXAMPLES

The following provides more detailed description of this disclosure by way of Examples, which however shall not be construed as being limiting in scope. Unless otherwise noted, "part(s)" and "%" are weight basis in the following Preparation Examples, Examples and Comparative Examples.

In Examples, various properties are evaluated by the methods described below.

(1) Weight-Average Molecular Weight (Mw) and Molecular Weight Distribution (Mw/Mn)

Molecular weights of block copolymers and hydrogenated block copolymers were measured at 38° C. by GPC using tetrahydrofuran (THF) as an eluent, in terms of standard polystyrene equivalent. HLC-8020 GPC (manufactured by Tosoh Corporation) was used as a measurement device.

(2) Percent Hydrogenation

Percent hydrogenation of main and side chains as well as aromatic rings of the hydrogenated block copolymer was calculated from measuring a 1H-NMR spectrum.

(3) Storage Modulus (G') of Adhesive Layer and Rigid Resin Layer

An adhesive composition and rigid resin are heat-press formed into sheets of 1 to 2 mm in thickness, and the sheets were cut out into test pieces of 50 mm in length and 10 mm in width.

Viscoelastic property was measured on each of the test pieces by means of a rheometer (ARES, manufactured by TA Instruments Japan Inc.) according to JIS K7244-2 (Plastics-Determination of dynamic mechanical properties-Part2: Torsion-pendulum method) under the conditions of angular frequency: 1 rad/s, measurement temperature range: −100° C. to 150° C., and heating rate: 5° C./min.

The values of storage modulus (G') at −20° C. and 40° C. were calculated from obtained measurement data for each of the test pieces.

(4) Mean Density Evaluation of Laminated Glass

An interlayer film was sandwiched between two sheets of blue-plate glass (300 mm in length, 300 mm in width, and 0.5 to 2.1 mm in thickness) and joined together to obtain a laminated glass as a test piece.

The test piece was weighed at 25° C. with using an electronic balance, volume of the laminated glass was calculated from the measured thickness and area, then mean density of the laminated glass (unit: g/cm$^3$) was calculated.

The mean density was judged as "within the range (Good)" for the mean density of 1.2 to 1.5 g/cm$^3$, whereas "Out of the range (Poor)" for the mean density of less than 1.2 g/cm$^3$ and more than 1.5 g/cm$^3$.

(5) Bending Modulus of Laminated Glass

A laminated glass (total thickness of 3 to 9 mm), where two glass sheets (100 mm in length, 20 mm in width, 0.5 to 2.1 mm in thickness) are stuck with an interlayer film, was used as a test piece.

A four-point flexural test was performed by means of an autograph (INSTRON 5582, manufactured by Instron Corporation), according to JIS R1602 (four-point flexure), with using a rotational four-point flexural test fixture, under the conditions of distance between supporting points: upper=26.7 mm, lower=80 mm, bearing rod diameter of 6 mm, and temperature of 25° C. Bending modulus was then measured with using a following formula 2.

$$E = \frac{5l^3(P_2 - P_1)}{27\, wt^3(y_2 - y_1)} \quad (2)$$

In the formula, Px denotes load applied at displacement amount of x of a load point (unit: N), yx denotes displacement amount of a load point (unit: m), w denotes width of the test piece (unit: m), l denotes distance between supporting rolls (unit: m), t denotes thickness of the test piece (unit: m), and E denotes elastic modulus from the four-point flexure (unit: N/m$^2$ (=Pa)).

The bending modulus was judged as "Good" for the bending modulus of 11×10$^9$ Pa or more, whereas "Poor" for the bending modulus of less than 11×10$^9$ Pa.

(6) Impact Resistance Evaluation of Laminated Glass

An interlayer film was sandwiched between two sheets of blue-plate glass (0.5 to 2.1 mm in thickness, 300 mm in width, and 300 mm in length) and joined together to obtain a laminated glass as a test piece.

The test piece thus obtained was used for the evaluation according to JIS R3212 (Test methods of safety glazing materials for road vehicles), that is: a steel ball having a mass of 227 g was dropped onto the test piece from a height of 8.5 to 12 m depending on thickness of the laminated glass under temperatures of −20° C. and 40° C., then presence of penetrations therefrom was checked, and total weight of debris of delaminated glass, coming from a side opposite to where impacted, was measured.

The impact resistance was judged as "Good" for no penetrations by the steel ball besides the total weight of the glass debris of 12 g or less, whereas "Poor" for any penetrations or the total weight of the glass debris of more than 12 g even if there are no penetrations.

Preparation Example 1

Preparation of Modified Hydrogenated Block Copolymer [E1]
(Block Copolymer [C1])

A fully nitrogen-purged reactor equipped with a stirrer was charged with 320 parts of dehydrated cyclohexane, 10 parts of dehydrated styrene, and 0.48 parts of dibutyl ether. Under stirring the whole mixture at 60° C., 0.89 parts of n-butyllithium (15% cyclohexane solution) was added to initiate polymerization. The mixture was kept stirred to react for another 20 minutes at 60° C. At this point, polymerization conversion rate was 99.5% according to a gas chromatography (GC) analysis of the reaction solution.

Then, 50 parts of dehydrated isoprene was added to the reaction solution continuously over 130 minutes. The reaction solution remained stirred for 30 minutes after the dehydrated isoprene had been completely added. The polymerization conversion rate at this point was 99.5% as a result of GC analysis of the reaction solution.

Thereafter, 40 parts of dehydrated styrene was further added to the reaction solution continuously over 110 minutes. The reaction solution remained stirred for 60 minutes after the dehydrated styrene had been completely added. The polymerization conversion rate at this point was about 100% as a result of GC analysis of the reaction solution.

A polymer solution containing block copolymers [C1] of [A]-[B]-[A]-type was obtained with adding 1.0 parts of isopropyl alcohol into the reaction solution to terminate the reaction. The resultant block copolymer [C1] had a weight-average molecular weight (Mw) of 46,200, a molecular weight distribution (Mw/Mn) of 1.03, and wA:wB of 50:50.

(Preparation of Hydrogenated Block Copolymer [D1])

The polymer solution prepared above was transferred to a pressure-resistant reactor equipped with a stirrer, and 4.0 parts of nickel catalyst supported on diatomaceous earth carrier ("E22U" manufactured by JGC Catalysts and Chemicals Ltd., nickel loading amount of 60%) as a hydrogenation catalyst and 30 parts of dehydrated cyclohexane were added and mixed. The reactor was purged with hydrogen gas and hydrogen was further fed to the reactor while stirring the solution to effect a hydrogenation reaction at a temperature of 190° C. under a pressure of 4.5 MPa for 6 hours.

The resultant hydrogenated block copolymer [D1], contained in the reaction solution obtained from the hydrogenation reaction, had a weight-average molecular weight (Mw) of 48,900 and a molecular weight distribution (Mw/Mn) of 1.04.

After completion of the hydrogenation reaction, the reaction solution was filtered to remove the hydrogenation catalyst. 2.0 parts of a xylene solution, in which 0.1 parts of a phenolic antioxidant of pentaerythritol-tetrakis[3-(3,5-di-t-butyl-4-hydroxyphenyl)propionate] ("Songnox® 1010" manufactured by Songwon Industrial Co., Ltd., Songnox is a registered trademark in Japan, other countries, or both) is dissolved, was then added to the reaction solution and dissolved.

Subsequently, cyclohexane, xylene, and other volatile components were removed from the abovementioned solution using a cylindrical evaporator ("Kontro" manufactured by Hitachi Ltd.) at a temperature of 260° C. under a pressure of 0.001 MPa or less.

The molten polymer was then extruded through a die into strands, and cooled to prepare into 95 parts of pelletized hydrogenated block copolymer [D1] using a pelletizer.

The resultant pelletized hydrogenated block copolymer [D1] had a weight-average molecular weight (Mw) of 48,400, a molecular weight distribution (Mw/Mn) of 1.09, and a percent hydrogenation of about 100%.

(Preparation of Modified Hydrogenated Block Copolymer [E1])

Two parts of vinyltrimethoxysilane and 0.2 parts of 2,5-dimethyl-2,5-di(t-butylperoxy)hexane ("PERHEXA® 25B" manufactured by NOF Corporation, PERHEXA is a registered trademark in Japan, other countries, or both) were added to 100 parts of the resultant pelletized hydrogenated block copolymer [D1] to obtain a mixture. The mixture was kneaded at a resin temperature of 200° C. for a residence time of 60 to 70 seconds using a twin-screw extruder, extruded into strands, air cooled, and cut using a pelletizer to prepare into 96 parts of pelletized modified hydrogenated block copolymer [E1] having alkoxysilyl groups.

(Measurement of Introduction Amount of Alkoxysilyl Groups)

Ten parts of the resultant pellets of modified hydrogenated block copolymer [E1] was dissolved into 100 parts of cyclohexane, and poured into 400 parts of dehydrated methanol to coagulate the modified hydrogenated block copolymer [E1], which was then filtered off. The filtered modified hydrogenated block copolymer [E1] was dried under vacuum at 25° C. to isolate 9.2 parts of crumbs of the modified hydrogenated block copolymer [E1].

According to an FTIR spectrum of the modified hydrogenated block copolymer [E1], new absorption bands derived from the Si—$OCH_3$ groups at 1,090 $cm^{-1}$ as well as from the Si—$CH_2$ groups at 825 $cm^{-1}$ and 739 $cm^{-1}$ were observed in different positions from those for absorption bands derived from the Si—$OCH_3$ groups and Si—$CH_2$ group of vinyltrimethoxysilane at 1,075 $cm^{-1}$, 808 $cm^{-1}$, and 766 $cm^{-1}$.

In addition, according to a $^1$H-NMR spectrum (measured in deuterated chloroform) of the modified hydrogenated block copolymer [E1], a peak corresponding to the protons of the methoxy groups was observed at 3.6 ppm. It was confirmed from the peak area ratio that 1.8 parts of vinyltrimethoxysilane was bonded per 100 parts of the hydrogenated block copolymer [D1].

Preparation Example 2

Preparation of Modified Hydrogenated Block Copolymer [E2]
(Block Copolymer [C2])

The same reactor as in Preparation Example 1 was charged with 310 parts of dehydrated cyclohexane and 0.84 parts of ethylene glycol dibutyl ether. Further, 0.80 parts of n-butyllithium (15% cyclohexane solution) was added to initiate polymerization. Twenty parts of dehydrated styrene was added into the reactor continuously over 50 minutes while the whole mixture was stirred at 60° C. The while mixture was kept stirred at 60° C. for another 40 minutes after dehydrated styrene had been completely added. At this point, polymerization conversion rate was 99.5% according to a GC measurement of the reaction solution.

Then, 60 parts of dehydrated isoprene was added to the reaction solution continuously over 130 minutes. The reaction solution remained stirred for another 20 minutes after the dehydrated isoprene had been completely added. The polymerization conversion rate at this point was 99.5% as a result of GC analysis of the reaction solution.

Thereafter, 20 parts of dehydrated styrene was further added to the reaction solution continuously over 60 minutes. The reaction solution remained stirred for another 30 minutes after the dehydrated styrene had been completely added. The polymerization conversion rate at this point was about 100% as a result of GC analysis of the reaction solution.

The reaction was terminated with adding 0.5 parts of isopropyl alcohol into the reaction solution. The resultant block copolymer [C2] had a weight-average molecular weight (Mw) of 50,700, a molecular weight distribution (Mw/Mn) of 1.03, wA:wB of 40:60, and 56% of structural units derived from 1,2- and 3,4-addition polymerization among total structural units derived from isoprene.

(Hydrogenated Block Copolymer [D2])

Subsequently, a hydrogenation reaction and an evaporation were performed as in Preparation Example 1 to prepare 92 parts of pelletized hydrogenated block copolymer [D2].

The resultant pelletized hydrogenated block copolymer [D2] had a weight-average molecular weight (Mw) of 53,100, a molecular weight distribution (Mw/Mn) of 1.09, and percent hydrogenations of about 100% for both of double bonds derived from conjugated dienes and double bonds derived from aroma rings.

(Preparation of Modified Hydrogenated Block Copolymer [E2])

Preparation Example 1 was repeated, with the exception of using the resultant pellets of hydrogenated block copolymer [D2], to prepare 94 parts of pelletized modified hydrogenated block copolymer [E2].

According to a measurement of introduction amount of alkoxysilyl groups in the modified hydrogenated block copolymer [E2], performed as in Preparation Example 1, it was confirmed that 1.8 parts of vinyltrimethoxysilane was bonded per 100 parts of the hydrogenated block copolymer [D2].

Preparation Example 3

Preparation of Hydrogenated Block Copolymer [S1]
(Block Copolymer [R1])

A polymerization reaction and a termination of the reaction were performed as in Preparation Example 1 with the exception that 10 parts of styrene, 40 parts of isoprene, and 50 parts of styrene were added in this order in separate three times, respectively.

The resultant block copolymer [R1] had a weight-average molecular weight (Mw) of 46,900, a molecular weight distribution (Mw/Mn) of 1.04, and wA:wB of 60:40.

(Hydrogenated Block Copolymer [S1])

Subsequently, a hydrogenation reaction and an evaporation were performed as in Preparation Example 1 to prepare 92 parts of pelletized hydrogenated block copolymer [S1].

The resultant pelletized hydrogenated block copolymer [S1] had a weight-average molecular weight (Mw) of 49,100, a molecular weight distribution (Mw/Mn) of 1.10, and a percent hydrogenation of about 100%.

Preparation Example 4

Preparation of Sheet [G1] where Adhesive Layer [G1] is Formed

A mixture was prepared by adding 0.8 parts of a ultraviolet absorber of 2-(3-t-butyl-2-hydroxy-5-metylphenyl)-5-chloro-2H-benzotriazol ("Tinuvin® 326" manufactured by BASF Japan Ltd., Tinuvin is a registered trademark in Japan, other countries, or both) and mixing uniformly into 100 parts of the pelletized modified hydrogenated block copolymer [E1] obtained in Preparation Example 1.

The mixture was extruded, while being kneaded, into a sheet [$G1_{0.38}$] having a thickness of 0.38 mm and into a sheet [$G1_{0.76}$] having a thickness of 0.76 mm, by means of a T-die film melt extrusion molding machine (T-die width of 400 mm) having a twin-screw kneader equipped with 37 mm-diameter screws, casting rollers with embossed patterns, and a sheet take-up unit equipped with nip rubber rollers, under the forming conditions of a molten resin temperature of 200° C., a T-die temperature of 200° C., and a cast roll temperature of 40° C.

Edges of the sheets [G1] were cut by means of a slitter to adjust its width to 330 mm, and then rolled up to be collected. The cut-off edge pieces were pelletized again and reused for forming the sheet [G1].

Two sheets [$G1_{0.76}$] were stacked and heat pressed to be formed into a sheet having a thickness of 1.52 mm. Viscoelastic properties were measured for the resultant sheet.

It was confirmed that the adhesive layer [G1] has storage moduli of $1.8 \times 10^8$ Pa and $0.95 \times 10^8$ Pa at $-20°$ C. and $40°$ C., respectively.

Moreover, the adhesive layer [G1] was confirmed, from the temperature value at which the tangent delta peak occurred, to have a glass-transition temperature in lower temperature side of $-50°$ C. The adhesive layer [G1] was further confirmed to have a density of 0.91 g/cm$^3$.

Preparation Example 5

Preparation of Sheet [G2] where Adhesive Layer [G2] is Formed

A sheet [$G2_{0.38}$] containing the ultraviolet absorber and having a thickness of 0.38 mm as well as a sheet [$G2_{0.76}$] containing the ultraviolet absorber and having a thickness of 0.76 mm were formed as in Preparation Example 4 with the exception that the pelletized modified hydrogenated block copolymer [E2] obtained in Preparation Example 2 was used.

Edges of the sheets [G2] were cut by means of a slitter to adjust its width to 330 mm, and then rolled up to be collected. The cut-off edge pieces were pelletized again and reused for forming the sheet [G2].

Two sheets [$G2_{0.76}$] were stacked and heat pressed to be formed into a sheet having a thickness of 1.52 mm. Viscoelastic properties were measured for the resultant sheet.

It was confirmed that the adhesive layer [G2] has storage moduli of $15.0 \times 10^8$ Pa and $0.94 \times 10^8$ Pa at $-20°$ C. and $40°$ C., respectively.

Moreover, the adhesive layer [G2] was confirmed, from the temperature value at which the tangent delta peak occurred, to have a glass-transition temperature in lower temperature side of $9°$ C. The adhesive layer [G2] was further confirmed to have a density of 0.91 g/cm$^3$.

Preparation Example 6

Preparation of Sheet [H1] where Rigid Resin Layer [H1] is Formed

A sheet [H1] containing the ultraviolet absorber and having a thickness of 0.76 mm was formed as in Preparation Example 4 with the exception that the pelletized hydrogenated block copolymer [S1] obtained in Preparation Example 3 was used.

Two sheets [H1] were stacked and heat pressed to be formed into a sheet having a thickness of 1.52 mm. Viscoelastic properties were measured for the resultant sheet.

It was confirmed that the rigid resin layer [H1] has storage moduli of $3.9 \times 10^8$ Pa and $3.0 \times 10^8$ Pa at $-20°$ C. and $40°$ C., respectively.

Moreover, the rigid resin layer [H1] was confirmed, from the temperature value at which the tangent delta peak occurred, to have a glass-transition temperature in lower temperature side of $-50°$ C. The rigid resin layer [H1] was further confirmed to have a density of 0.91 g/cm$^3$.

Example 1

Laminated Glass [M1-G1H1]

Blue-plate glass (1.1 mm in thickness, 300 mm in length, and 300 mm in width), Two sheets [G1$_{0.38}$] prepared in Preparation Example 4, and Seven sheets [H1] prepared in Preparation Example 6 were stacked in the order of glass sheet/sheet [G1$_{0.38}$]/sheet [H1]/sheet [H1]/sheet [H1]/sheet [H1]/sheet [H11]/sheet [H1]/sheet [H11]/sheet [G1$_{0.38}$]/glass sheet.

The stack thus obtained was placed into a resin bag having a layered structure of nylon/adhesive layer/polypropylene with a thickness of 75 μm. The stack was then seal-packed by heat sealing an open mouth of the bag while degassing inside of the bag using a seal-packer ("BH-951" manufactured by Panasonic Corporation).

The seal-packed stack was placed in an autoclave, treated at a temperature of $150°$ C. under a pressure of 0.8 MPa for 30 minutes to produce a laminated glass [M1a-G1H1] having a layered structure of glass sheet/adhesive layer [G1]/rigid resin layer [H11]/adhesive layer [G1]/glass sheet. The laminated glass [M1a-G1H1] had a good appearance where no defects such as air bubbles and cracks were observed.

It was calculated that, from storage modulus values measured for the adhesive layer [G1] and the rigid resin layer [H1], the interlayer film [J1] in the laminated glass [M1-G1H1] had storage modulus values of $3.4 \times 10^8$ Pa and $2.3 \times 10^8$ Pa at $-20°$ C. and $40°$ C., respectively, according to the aforementioned formula 1.

It was calculated that the resultant laminated glass [M1a-G1H1] had a thickness of 8.28 mm, a weight of 993 g, and a mean density of 1.33 g/cm$^3$. The mean density was thus judged as "Good".

The result is reported in Table 1.

Impact resistance evaluations for the obtained laminated glass [M1a-G1H1] resulted in judged as "Good" for both cases at $-20°$ C. and $40°$ C., as no steel balls penetrated and total weights of glass debris were less than 1 g.

The result is reported in Table 1.

Blue-plate glass (1.1 mm in thickness, 100 mm in length, and 20 mm in width), Two sheets [G1$_{0.38}$] prepared in Preparation Example 4, and Seven sheets [H1$_{0.76}$] prepared in Preparation Example 6 were used to produce a laminated glass [M1b-G1H1], having the same layered structure as in the laminated glass [M1a-G1H1], for bending modulus measurements. The laminated glass [M1b-G1H1] had a good appearance where no defects such as air bubbles and cracks were observed.

It was measured that the resultant laminated glass [M1b-G1H1] had a bending modulus of $13 \times 10^9$ Pa, judged as "Good".

The result is reported in Table 1.

Example 2

Laminated Glass [M2-G1H2]

Laminated glass [M2a-G1H2] and [M2b-G1H2], having a layered structure of glass sheet/adhesive layer [G1]/rigid resin layer [H2]/adhesive layer [G1]/rigid resin layer [H2]/adhesive layer [G1]/glass sheet, were produced as in Example 1 with the exception that three sheets [G1$_{0.76}$] prepared in Preparation Example 4 and two polycarbonate sheets [H2] treated with corona discharge on their surfaces (having a thickness of 2.0 mm, manufactured by C.I. TAKIRON Corporation) were laid between two sheets of the same blue-plate glass as in Example 1 to stack in the order of glass sheet/sheet [G1$_{0.76}$]/sheet [H2]/sheet [G1$_{0.76}$]/sheet [H2]/sheet [G1$_{0.76}$]/glass sheet. The laminated glass [M2a-G1H2] and [M2b-G1H2] had good appearances where no defects such as air bubbles and cracks were observed.

The polycarbonate sheet [H2] used above had storage moduli of $2.1 \times 10^9$ Pa and $1.9 \times 10^9$ Pa at $-20°$ C. and $40°$ C., respectively, and a specific gravity of 1.20.

It was calculated that, from storage modulus values measured for the adhesive layer [G1] and the rigid resin layer [H2], the interlayer film [J2] in the laminated glass [M2-G1H2] had storage modulus values of $4.4 \times 10^8$ Pa and $2.4 \times 10^8$ Pa at $-20°$ C. and $40°$ C., respectively, according to the aforementioned formula 1.

It was calculated that the resultant laminated glass [M2a-G1H2] had a thickness of 8.48 mm, a weight of 1,114 g, and a mean density of 1.46 g/cm$^3$. The mean density was thus judged as "Good".

Moreover, impact resistance evaluations for the obtained laminated glass [M2a-G1H2] resulted in judged as "Good" for both cases at $-20°$ C. and $40°$ C., as no steel balls penetrated and total weights of glass debris were less than 1 g.

Further, it was measured that the laminated glass [M2b-G1H2] had a bending modulus of $17 \times 10^9$ Pa, judged as "Good".

These results are reported in Table 1.

Comparative Example 1

Laminated Glass [M3-G1]

Laminated glass [M3a-G1] and [M3b-G1], having a layered structure of glass sheet/adhesive layer [G1]/glass sheet, were produced as in Example 1 with the exception that eight sheets [G1$_{0.76}$] prepared in Preparation Example 4 were laid between two sheets of the same blue-plate glass as in Example 1 to stack in the order of glass sheet/sheet [G1$_{0.76}$]/sheet [G1$_{0.76}$]/sheet [G1$_{0.76}$]/sheet [G1$_{0.76}$]/sheet [G1$_{0.76}$]/sheet [G1$_{0.76}$]/sheet [G1$_{0.76}$]/sheet [G1$_{0.76}$]/glass sheet. The laminated glass [M3a-G1] and [M3b-G1] had good appearances where no defects such as air bubbles and cracks were observed.

It was calculated that, from storage modulus values measured for the adhesive layers [G1], the interlayer film [J3] in the laminated glass [M3-G1] had storage modulus values of $1.8 \times 10^8$ Pa and $0.95 \times 10^8$ Pa at $-20°$ C. and $40°$ C., respectively, according to the aforementioned formula 1.

It was calculated that the resultant laminated glass [M3a-G1] had a thickness of 8.28 mm, a weight of 993 g, and a mean density of 1.33 g/cm$^3$. The mean density was thus judged as "Good".

Moreover, impact resistance evaluations for the obtained laminated glass [M3a-G1] resulted in judged as "Good" for both cases at −20° C. and 40° C., as no steel balls penetrated and total weights of glass debris were less than 1 g.

Further, it was measured that the resultant laminated glass [M3b-G1] had a bending modulus of $10 \times 10^9$ Pa, judged as "Poor".

These results are reported in Table 1.

Comparative Example 2

Laminated Glass [M4-G2]

Laminated glass [M4a-G2] and [M4b-G2], having a layered structure of glass sheet/adhesive layer [G2]/glass sheet, were produced as in Example 1 with the exception that eight sheets [G2$_{0.76}$] prepared in Preparation Example 5 were laid between two sheets of the same blue-plate glass as in Example 1 to stack in the order of glass sheet/sheet [G2$_{0.76}$]/sheet [G2$_{0.76}$]/sheet [G2$_{0.76}$]/sheet[G2$_{0.76}$]/sheet[G2$_{0.76}$]/sheet[G2$_{0.76}$]/sheet [G2$_{0.76}$]/sheet [G2$_{0.76}$]/glass sheet. The laminated glass [M4a-G2] and [M4b-G2] had good appearances where no defects such as air bubbles and cracks were observed.

It was calculated that, from storage modulus values measured for the adhesive layers [G2], the interlayer film [J4] in the laminated glass [M4-G2] had storage modulus values of $15.0 \times 10^8$ Pa and $0.94 \times 10^8$ Pa at −20° C. and 40° C., respectively, according to the aforementioned formula 1.

It was calculated that the resultant laminated glass [M4a-G2] had a thickness of 8.28 mm, a weight of 993 g, and a mean density of 1.33 g/cm$^3$. The mean density was thus judged as "Good".

Moreover, impact resistance evaluations for the obtained laminated glass [M4a-G2] resulted in judged as "Good" for a case at 40° C. where a steel ball did not penetrate and a total weight of glass debris was less than 1 g, whereas judged as "Poor" for a case at −20° C. where a steel ball penetrated.

Further, it was measured that the obtained laminated glass [M4b-G2] had a bending modulus of $12 \times 10^9$ Pa, judged as "Good".

These results are reported in Table 1.

Comparative Example 3

Laminated Glass [M5-J$_N$]

Laminated glass [M5a-J$_N$] in which three interlayer films [J$_n$] (thickness of 0.76 mm) made of polyvinyl butyral are stacked and stuck between two sheets of blue-plate glass (1.1 mm in thickness, 300 mm in length, and 300 mm in width), and laminated glass [M5b-J$_N$] in which three interlayer films [J$_n$] (thickness of 0.76 mm) made of polyvinyl butyral are stacked and stuck between two sheets of blue-plate glass (1.1 mm in thickness, 100 mm in length, and 20 mm in width), both are manufactured by Osaka Glass Industry Co., Ltd., were used as test samples.

The polyvinyl butyral interlayer films [J$_n$] used above had storage moduli of $5.5 \times 10^8$ Pa and $0.015 \times 10^8$ Pa at −20° C. and 40° C., respectively, and a specific gravity of 1.07.

It was calculated that, from storage modulus values measured for the adhesive layers [J$_n$], the interlayer film [J5] in the laminated glass [M5-J$_N$] had storage modulus values of $5.5 \times 10^8$ Pa and $0.015 \times 10^8$ Pa at −20° C. and 40° C., respectively, according to the aforementioned formula 1.

It was calculated that the laminated glass [M5a-J$_N$] had a thickness of 4.48 mm, a weight of 714 g, and a mean density of 1.77 g/cm$^3$. The mean density was thus judged as "Poor".

Moreover, it was measured that the laminated glass [M5b-J$_N$] had a bending modulus of $4 \times 10^9$ Pa, judged as "Poor".

These results are reported in Table 1.

TABLE 1

| | | Example 1 | Example 2 | Comparative Example 1 | Comparative Example 2 | Comparative Example 3 |
|---|---|---|---|---|---|---|
| | Laminated glass | [M1-G1H1] | [M2-G1H2] | [M3-G1] | [M4-G2] | [M5-J$_N$] |
| | Thickness of the first glass (mm) | 1.1 | 1.1 | 1.1 | 1.1 | 1.1 |
| Interlayer film | Thickness of Adhesive layer [G1] (mm) | 0.76 | 2.28 | 6.08 | — | — |
| | Thickness of Adhesive layer [G2] (mm) | — | — | — | 6.08 | — |
| | Thickness of Interlayer film [Jn] (mm) | — | — | — | — | 2.28 |
| | Thickness of Rigid resin layer [H1] (mm) | 5.32 | — | — | — | — |
| | Thickness of Rigid resin layer [H2] (mm) | — | 4.00 | — | — | — |
| | Storage modulus −20° C. | $3.4 \times 10^8$ | $4.4 \times 10^8$ | $1.8 \times 10^8$ | $15 \times 10^8$ | $5.5 \times 10^8$ |
| | (Pa) 40° C. | $2.3 \times 10^8$ | $2.4 \times 10^8$ | $0.95 \times 10^8$ | $0.94 \times 10^8$ | $0.015 \times 10^8$ |
| | Thickness of the second glass (mm) | 1.1 | 1.1 | 1.1 | 1.1 | 1.1 |
| | Evaluation of Laminated glass | | | | | |
| | Thickness of Laminated glass (mm) | 8.28 | 8.48 | 8.28 | 8.28 | 4.48 |
| | Mean density (g/cm3) | 1.33 | 1.46 | 1.33 | 1.33 | 1.77 |
| | | Good | Good | Good | Good | Poor |
| Impact resistance | −20° C. | Good | Good | Good | Poor | — |
| | 40° C. | Good | Good | Good | Good | — |
| | Bending modulus (Pa) | $13 \times 10^9$ | $17 \times 10^9$ | $10 \times 10^9$ | $12 \times 10^9$ | $4 \times 10^9$ |
| | | Good | Good | Poor | Good | Poor |

Example 3

Laminated Glass [M6-G1H1]

Laminated glass [M6a-G1H1] and [M6b-G1H1], having a layered structure of glass sheet/adhesive layer [G1]/rigid resin layer [H1]/adhesive layer [G1]/glass sheet, were produced as in Example 1 with the exception that two sheets [G1$_{0.38}$] prepared in Preparation Example 4 and five sheets [H1] prepared in Preparation Example 6 were laid between two sheets of blue-plate glass having a thickness of 0.5 mm to stack in the order of glass sheet/sheet [G1$_{0.38}$]/sheet [H1]/sheet [H1]/sheet [H1]/sheet [H1]/sheet [H1]/sheet [G1$_{0.38}$]/glass sheet. The laminated glass [M6a-G1H1] and [M6b-G1H1] had good appearances where no defects such as air bubbles and cracks were observed.

It was calculated that, from storage modulus values measured for the adhesive layer [G1] and the rigid resin layer [H1], the interlayer film [J6] in the laminated glass [M6-G1H1] had storage modulus values of $3.3 \times 10^8$ Pa and $2.2 \times 10^8$ Pa at −20° C. and 40° C., respectively, according to the aforementioned formula 1.

It was calculated that the resultant laminated glass [M6a-G1H1] had a thickness of 5.56 mm, a weight of 598 g, and a mean density of 1.20 g/cm³. The mean density was thus judged as "Good".

Moreover, impact resistance evaluations for the obtained laminated glass [M6a-G1H1] resulted in judged as "Good" for both cases at −20° C. and 40° C., as no steel balls penetrated and total weights of glass debris were less than 1 g.

Further, it was measured that the obtained laminated glass [M6b-G1H1] had a bending modulus of 11×10⁹ Pa, judged as "Good".

These results are reported in Table 2.

Comparative Example 4

Laminated Glass [M7-G1]

Laminated glass [M7a-G1] and [M7b-G1], having a layered structure of glass sheet/adhesive layer [G1]/glass sheet, were produced as in Example 1 with the exception that six sheets [G1$_{0.76}$] prepared in Preparation Example 4 were laid between two sheets of blue-plate glass having a thickness of 0.5 mm to stack in the order of glass sheet/sheet [G1$_{0.76}$]/sheet [G1$_{0.76}$]/sheet [G1$_{0.76}$]/sheet [G1$_{0.76}$]/sheet [G1$_{0.76}$]/sheet [G1$_{0.76}$]/glass sheet. The laminated glass [M7a-G1] and [M7b-G1] had good appearances where no defects such as air bubbles and cracks were observed.

It was calculated that, from storage modulus values measured for the adhesive layer [G1], the interlayer film [J7] in the laminated glass [M7-G1] had storage modulus values of 1.8×10⁸ Pa and 0.95×10⁸ Pa at −20° C. and 40° C., respectively, according to the aforementioned formula 1.

It was calculated that the resultant laminated glass [M7a-G1] had a thickness of 5.56 mm, a weight of 598 g, and a mean density of 1.20 g/cm³. The mean density was thus judged as "Good".

Moreover, impact resistance evaluations for the obtained laminated glass [M7a-G1] resulted in judged as "Good" for both cases at −20° C. and 40° C., as no steel balls penetrated and total weights of glass debris were less than 1 g.

Further, it was measured that the obtained laminated glass [M7b-G1] had a bending modulus of 9×10⁹ Pa, judged as "Poor".

These results are reported in Table 2.

Comparative Example 5

Laminated Glass [M8-G1H1]

Laminated glass [M8a-G1H1] and [M8b-G1H1], having a layered structure of glass sheet/adhesive layer [G1]/sheet [H1]/sheet [G1]/glass sheet, were produced as in Example 1 with the exception that two sheets [G1$_{0.38}$] prepared in Preparation Example 4 and six sheets [H1] prepared in Preparation Example 6 were laid between two sheets of blue-plate glass having a thickness of 0.5 mm to stack in the order of glass sheet/sheet [G1$_{0.38}$]/sheet [H1]/sheet [H1]/sheet [H1]/sheet [H1]/sheet [H1]/sheet [H1]/sheet [G1$_{0.38}$]/glass sheet. The laminated glass [M8a-G1H1] and [M8b-G1H1] had good appearances where no defects such as air bubbles and cracks were observed.

It was calculated that, from storage modulus values measured for the adhesive layer [G1] and the rigid resin layer [H1], the interlayer film [J8] in the laminated glass [M8-G1H1] had storage modulus values of 3.4×10⁸ Pa and 2.3×10⁸ Pa at −20° C. and 40° C., respectively, according to the aforementioned formula 1.

It was calculated that the resultant laminated glass [M8a-G1H1] had a thickness of 6.32 mm, a weight of 661 g, and a mean density of 1.16 g/cm³. The mean density was thus judged as "Poor".

Moreover, impact resistance evaluations for the obtained laminated glass [M8a-G1H1] resulted in judged as "Good" for both cases at −20° C. and 40° C., as no steel balls penetrated and total weights of glass debris were less than 1 g.

Further, it was measured that the obtained laminated glass [M8b-G1H1] had a bending modulus of 9×10⁹ Pa, judged as "Poor".

These results are reported in Table 2.

Comparative Example 6

Laminated Glass [M9-J$_N$]

Laminated glass [M9a-J$_N$] in which one polyvinyl butyral interlayer film (thickness of 0.76 mm), same as those used in Comparative Example 3, is sandwiched between two sheets of blue-plate glass (2.1 mm in thickness, 300 mm in length, and 300 mm in width), and laminated glass [M9b-J$_N$] in which one polyvinyl butyral interlayer film (thickness of 0.76 mm) same as above is sandwiched between two sheets of blue-plate glass (2.1 mm in thickness, 100 mm in length, and 20 mm in width), both are manufactured by Osaka Glass Industry Co., Ltd., were used as test samples. These test samples were used as the laminated glass having the same structure in thickness as in the general laminated glass for automobile windows.

The polyvinyl butyral interlayer films [JN] used above had storage moduli of 5.5×10⁸ Pa and 0.015×10⁸ Pa at −20° C. and 40° C., respectively, and a specific gravity of 1.07.

It was calculated that the laminated glass [M9a-J$_N$] had a thickness of 4.96 mm, a weight of 1,018 g, and a mean density of 2.28 g/cm³. The mean density was thus judged as "Poor".

Moreover, it was measured that the laminated glass [M9b-J$_N$] had a bending modulus of 11×10⁹ Pa, judged as "Good".

These results are reported in Table 2.

TABLE 2

|  |  | Comparative Example 3 | Comparative Example 4 | Comparative Example 5 | Comparative Example 6 |
|---|---|---|---|---|---|
|  | Laminated glass | [M6-G1H1] | [M7-G1] | [M8-G1H1] | [M9-J$_N$] |
|  | Thickness of the first glass (mm) | 0.5 | 0.5 | 0.5 | 2.1 |
| Interlayer film | Thickness of Adhesive layer [G1] (mm) | 0.76 | 4.56 | 0.76 | — |
|  | Thickness of Interlayer film [Jn] (mm) | — | — | — | 0.76 |
|  | Thickness of Rigid resin layer [H1] (mm) | 3.80 | — | 4.56 | — |

TABLE 2-continued

|  |  | Example 3 | Comparative Example 4 | Comparative Example 5 | Comparative Example 6 |
|---|---|---|---|---|---|
| Storage modulus | −20° C. | $3.3 \times 10^8$ | $1.8 \times 10^8$ | $3.4 \times 10^8$ | $5.5 \times 10^8$ |
| (Pa) | 40° C. | $2.2 \times 10^8$ | $0.95 \times 10^8$ | $2.3 \times 10^8$ | $0.015 \times 10^8$ |
| Thickness of the second glass (mm) |  | 0.5 | 0.5 | 0.5 | 2.1 |
| Evaluation of Laminated glass |  |  |  |  |  |
| Thickness of Laminated glass (mm) |  | 5.56 | 5.56 | 6.32 | 4.96 |
| Mean density (g/cm3) |  | 1.20 | 1.20 | 1.16 | 2.28 |
|  |  | Good | Good | Poor | Poor |
| Impact resistance | −20° C. | Good | Good | Good | — |
|  | 40° C. | Good | Good | Good | — |
| Bending modulus (Pa) |  | $11 \times 10^9$ | $9 \times 10^9$ | $10 \times 10^9$ | $11 \times 10^9$ |
|  |  | Good | Poor | Poor | Good |

The followings were found from the results of Examples and Comparative Examples.

When using the interlayer film having the storage modulus within the specified range at −20° C. and 40° C., it is possible to obtain the laminated glass having the bending modulus equal to or greater than, as well as being excellently lightweight with the reduced mean density by 35% or more (Examples 1 to 3), compared with those of the conventional laminated glass commonly used for automobile windows (Comparative Example 6).

In contrast, when using the interlayer film having the storage modulus lower than the specified range, the bending modulus of the laminated glass became more likely to decrease, and consequently it was difficult to reduce the weight of the laminated glass while maintaining the rigidity (Comparative Examples 1 and 4).

With the interlayer film having the storage modulus of more than $1 \times 10^9$ Pa, the impact resistance at −20° C. was found to be inferior (Comparative Example 2).

Moreover, in the situation where the polyvinyl butyral-based interlayer film, having the low storage modulus at normal temperature, was used, it was difficult to obtain the laminated glass excellent in lightness with the maintained rigidity and the reduced mean density. This was because increasing the mean density of the laminated glass by reducing the glass thickness while increasing the interlayer film thickness resulted in significant decrease in the bending modulus (Comparative Example 3).

Further, with the mean density excessively low as a result of increasing the thickness ratio of the interlayer film, the bending modulus of the laminated glass decreased even when using the interlayer film having the storage modulus within the specified range (Comparative Example 5).

INDUSTRIAL APPLICABILITY

The laminated glass of the present disclosure has bending modulus equal to or greater than, a mean specific gravity lower than, and an excellent impact resistance under low to normal temperature range, compared with those of laminated glass commonly used. Therefore, the presently disclosed laminated glass is useful for applications such as window materials for vehicles; window materials, roofing materials and flooring materials for buildings; as well as window materials for watercrafts and aircrafts.

REFERENCE SIGNS LIST

1 Laminated glass
2 Glass sheet
3 Adhesive layer [G]
4 Rigid resin layer [H]
5 Interlayer film [J]
6 Multilayered interlayer film [j] prepared by stacking layers beforehand

The invention claimed is:

1. A laminated glass in which a plurality of glass sheets is joined together with an interlayer film J in between, wherein
  i) a mean density of the laminated glass is in a range from 1.2 to 1.5 g/cm$^3$ at a temperature of 25° C.,
  ii) the interlayer film J has layered structure comprising at least two adhesive layers G and at least one rigid resin layer H positioned between the two adhesive layers G, the adhesive layer G comprising an adhesive that mainly contains a thermoplastic elastomer F having an alkoxysilyl group,
  iii) a storage modulus of the rigid resin layer H has a higher value than a storage modulus of the adhesive layer G,
  iv) a storage modulus of the interlayer film J, which is either calculated from a following formula 1 or measured, is in a range from $2.0 \times 10^8$ to $1.0 \times 10^9$ Pa at a temperature of −20° C. and $1.0 \times 10^8$ to $8.0 \times 10^8$ Pa at a temperature of 40° C., $$G' = (\Sigma_i t_i)/(\Sigma_i(t_i/G'_i)) \qquad (1)$$

where G' is the calculated storage modulus of the interlayer film, $G'_i$ is the storage modulus of an i-th layer in the interlayer film, $t_i$ is a thickness of the i-th layer, and $\Sigma_i$ is a sum of numerical values of the i-th layer;
  v) thickness of the interlayer film J is from 0.1 to 10 mm, and
  vi) thickness of the rigid resin layer H is from 0.05 to 5 mm.

2. The laminated glass according to claim 1, wherein the thermoplastic elastomer F having an alkoxysilyl group comprises a modified hydrogenated block copolymer E resulted from introducing the alkoxysilyl group into a hydrogenated block copolymer D deriving from 95% or more of hydrogenation of carbon-carbon unsaturated bonds in a main chain and a side chain as well as of carbon-carbon unsaturated bonds in aromatic rings of a block copolymer C, the block copolymer C comprising at least two polymer blocks A and at least one polymer block B, the polymer block A mainly containing a structural unit derived from an aromatic vinyl compound, while the polymer block B mainly containing a structural unit derived from a chain conjugated diene compound, the block copolymer C having a ratio between wA and wB as wA:wB of 30:70 to 60:40 where wA denotes a weight fraction of a total amount of the polymer block A accounting for the whole block copolymer C while wB denotes a weight fraction of a total amount of the polymer block B accounting for the whole block copolymer C.

3. The laminated glass according to claim 1,
wherein the rigid resin layer H comprises a layer comprising at least one rigid resin selected from the group consisting of hydrogenated block copolymer S comprising, in a molecule, a polymer block having a repeat unit derived from an aromatic vinyl compound and a polymer block having a repeat unit derived from a chain conjugated diene compound; polycarbonate; polyester-based resin; polyacrylic acid ester-based resin; and polymethacrylic acid ester-based resin.

4. The laminated glass according to claim 3,
wherein the hydrogenated block copolymer S is derived from 95% or more of hydrogenation of carbon-carbon unsaturated bonds in a main chain and a side chain as well as of carbon-carbon unsaturated bonds in aromatic rings of a block copolymer R, the block copolymer R comprising at least two polymer blocks P and at least one polymer block Q, the polymer block P mainly containing a structural unit derived from an aromatic vinyl compound, while the polymer block Q mainly containing a structural unit derived from a chain conjugated diene compound, the block copolymer R having a ratio between wP and wQ as wP:wQ of 50:50 to 70:30 where wP denotes a weight fraction of a total amount of the polymer block P accounting for the whole block copolymer R while wQ denotes a weight fraction of a total amount of the polymer block Q accounting for the whole block copolymer R.

5. The laminated glass according to claim 2,
wherein the rigid resin layer H comprises a layer comprising at least one rigid resin selected from the group consisting of hydrogenated block copolymer S comprising, in a molecule, a polymer block having a repeat unit derived from an aromatic vinyl compound and a polymer block having a repeat unit derived from a chain conjugated diene compound; polycarbonate; polyester-based resin; polyacrylic acid ester-based resin; and polymethacrylic acid ester-based resin.

* * * * *